United States Patent
Aoki et al.

(10) Patent No.: US 10,164,275 B2
(45) Date of Patent: Dec. 25, 2018

(54) FUEL CELL SYSTEM

(71) Applicant: NISSAN MOTOR CO., LTD., Yokohama-shi, Kanagawa (JP)

(72) Inventors: Tetsuya Aoki, Kanagawa (JP); Takahiro Kaito, Kanagawa (JP); Takahiro Fujii, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/124,763

(22) PCT Filed: Mar. 13, 2014

(86) PCT No.: PCT/JP2014/056762
§ 371 (c)(1),
(2) Date: Sep. 9, 2016

(87) PCT Pub. No.: WO2015/136677
PCT Pub. Date: Sep. 17, 2015

(65) Prior Publication Data
US 2017/0018791 A1    Jan. 19, 2017

(51) Int. Cl.
*H01M 8/04746* (2016.01)
*H01M 8/04828* (2016.01)
(Continued)

(52) U.S. Cl.
CPC ..... *H01M 8/04753* (2013.01); *H01M 8/0485* (2013.01); *H01M 8/04097* (2013.01);
(Continued)

(58) Field of Classification Search
CPC ..... H01M 2008/1095; H01M 2250/20; H01M 8/04097; H01M 8/04231; H01M 8/04388;
(Continued)

(56) References Cited

U.S. PATENT DOCUMENTS

2009/0258257 A1* 10/2009 Kaito ............... H01M 8/04179
429/430
2011/0200896 A1    8/2011 Hasegawa et al.
(Continued)

FOREIGN PATENT DOCUMENTS

CA    2838647 A1 * 12/2012 ........ H01M 8/04723
JP    2010-538415 A    12/2010
(Continued)

*Primary Examiner* — Sarah A. Slifka
*Assistant Examiner* — Victoria H Lynch
(74) *Attorney, Agent, or Firm* — Foley & Lardner LLP

(57) ABSTRACT

A fuel cell system includes: a wetness target value calculating unit configured to calculate a target value of a wet state of the fuel cell; a gas required flow rate calculating unit configured to calculate a cathode gas required flow rate on the basis of a power generation request to the fuel cell; a wetness-control anode gas flow rate calculating unit configured to calculate a wetness-control anode gas circulation flow rate at least on the basis of the wetness target value and the cathode gas required flow rate during a dry control; an anode gas flow rate control unit configured to control an anode gas circulation flow rate on the basis of the wetness-control anode gas circulation flow rate; a wetness-control cathode gas flow rate calculating unit configured to calculate a wetness-control cathode gas flow rate at least on the basis of the wetness target value and a measured value or estimated value of the anode gas circulation flow rate during the dry control; and a cathode gas flow rate control unit configured to control a cathode gas flow rate on the basis of the cathode gas required flow rate and the wetness-control cathode gas flow rate.

6 Claims, 18 Drawing Sheets

(51) Int. Cl.
  *H01M 8/04089* (2016.01)
  *H01M 8/0438* (2016.01)
  *H01M 8/04492* (2016.01)
  *H01M 8/04537* (2016.01)
  *H01M 8/04223* (2016.01)
  *H01M 8/1018* (2016.01)

(52) U.S. Cl.
  CPC ... *H01M 8/04231* (2013.01); *H01M 8/04388* (2013.01); *H01M 8/04395* (2013.01); *H01M 8/04529* (2013.01); *H01M 8/04619* (2013.01); *H01M 2008/1095* (2013.01); *H01M 2250/20* (2013.01); *Y02T 90/32* (2013.01)

(58) Field of Classification Search
  CPC ......... H01M 8/04395; H01M 8/04529; H01M 8/04619; H01M 8/04753; H01M 8/0485
  See application file for complete search history.

(56) References Cited

U.S. PATENT DOCUMENTS

| | | |
|---|---|---|
| 2013/0157161 A1 | 6/2013 | Matsusue |
| 2014/0093796 A1 | 4/2014 | Aoki et al. |

FOREIGN PATENT DOCUMENTS

| | | |
|---|---|---|
| JP | 2012-43677 A | 3/2012 |
| JP | 2012-252939 A | 12/2012 |

* cited by examiner

FUEL CELL SYSTEM

TECHNICAL FIELD

The present invention relates to a fuel cell system including a fuel cell for generating electric power while receiving supplies of an anode gas and a cathode gas.

BACKGROUND ART

In a fuel cell, power generation performance is lowered in a case where the degree of wetness of an electrolyte membrane becomes too high or too low. In order to cause the fuel cell to effectively generate electric power, it is important to maintain the electrolyte membrane of the fuel cell at the proper degree of wetness.

JP2010-538415A discloses a fuel cell system in which the degree of wetness of a fuel cell is adjusted by controlling at least one of an anode gas flow rate and a cathode gas flow rate.

SUMMARY OF INVENTION

The above publication merely discloses that the degree of wetness of the fuel cell can be adjusted by an anode gas flow rate control and a cathode gas flow rate control, but does not discloses that the degree of wetness is properly adjusted on the basis of the anode gas flow rate control and the cathode gas flow rate control.

On the other hand, concerning a wetness control of a fuel cell, the inventors of the present application found out that the degree of wetness of the fuel cell can be hardly adjusted by an anode gas flow rate control even if an anode gas flow rate is changed when a cathode gas flow rate is high. In other words, in a case of adjusting the degree of wetness of the fuel cell by controlling the anode gas flow rate, it is necessary to reduce the cathode gas flow rate as much as possible. Thus, in a conventional fuel cell system not taking this point into consideration, there is a possibility that a cathode gas flow rate control unit or an anode gas flow rate control unit configured by a compressor, a pump or the like is operated more than necessary at the time of a wetness control.

It is an object of the present invention to provide a fuel cell system capable of adjusting the degree of wetness of a fuel cell by properly controlling a cathode gas flow rate control unit and an anode gas flow rate control unit.

According to an aspect of the present invention, there is provided a fuel cell system including a fuel cell for generating electric power while receiving supplies of an anode gas and a cathode gas and a circulation mechanism configured to supply an anode off-gas discharged from the fuel cell to the fuel cell. The fuel cell system includes: a wetness target value calculating unit configured to calculate a target value of a wet state of the fuel cell; a gas required flow rate calculating unit configured to calculate a cathode gas required flow rate on the basis of a power generation request to the fuel cell; a wetness-control anode gas flow rate calculating unit configured to calculate a wetness-control anode gas circulation flow rate at least on the basis of the wetness target value and the cathode gas required flow rate during a dry control; and an anode gas flow rate control unit configured to control an anode gas circulation flow rate on the basis of the wetness-control anode gas circulation flow rate. Further, the fuel cell system includes: a wetness-control cathode gas flow rate calculating unit configured to calculate a wetness-control cathode gas flow rate at least on the basis of the wetness target value and a measured value or estimated value of the anode gas circulation flow rate during the dry control; and a cathode gas flow rate control unit configured to control a cathode gas flow rate on the basis of the cathode gas required flow rate and the wetness-control cathode gas flow rate.

DESCRIPTION OF EMBODIMENT

Hereinafter, an embodiment of the present invention will be described with reference to the drawings and the like.

A fuel cell is composed of an anode electrode as a fuel electrode, a cathode electrode as an oxidant electrode and an electrolyte membrane arranged to be sandwiched between these electrodes. The fuel cell generates electric power using an anode gas containing hydrogen and supplied to the anode electrode and a cathode gas containing oxygen and supplied to the cathode electrode. Electrode reactions which proceed in both anode and cathode electrodes are as follows.

$$\text{Anode electrode: } 2H_2 \rightarrow 4H^+ + 4e^- \tag{1}$$

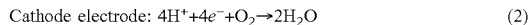

$$\text{Cathode electrode: } 4H^+ + 4e^- + O_2 \rightarrow 2H_2O \tag{2}$$

The fuel cell generates an electromotive force of about 1 V (volt) by these electrode reactions (1) and (2).

Figure 1:
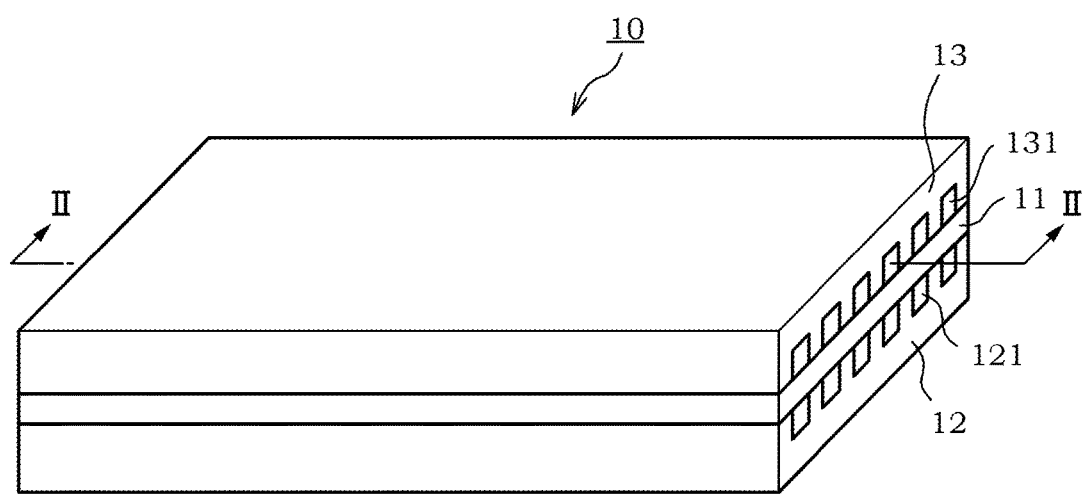
FIG. 1 is a perspective view of a fuel cell according to an embodiment of the present invention.
Figure 2:
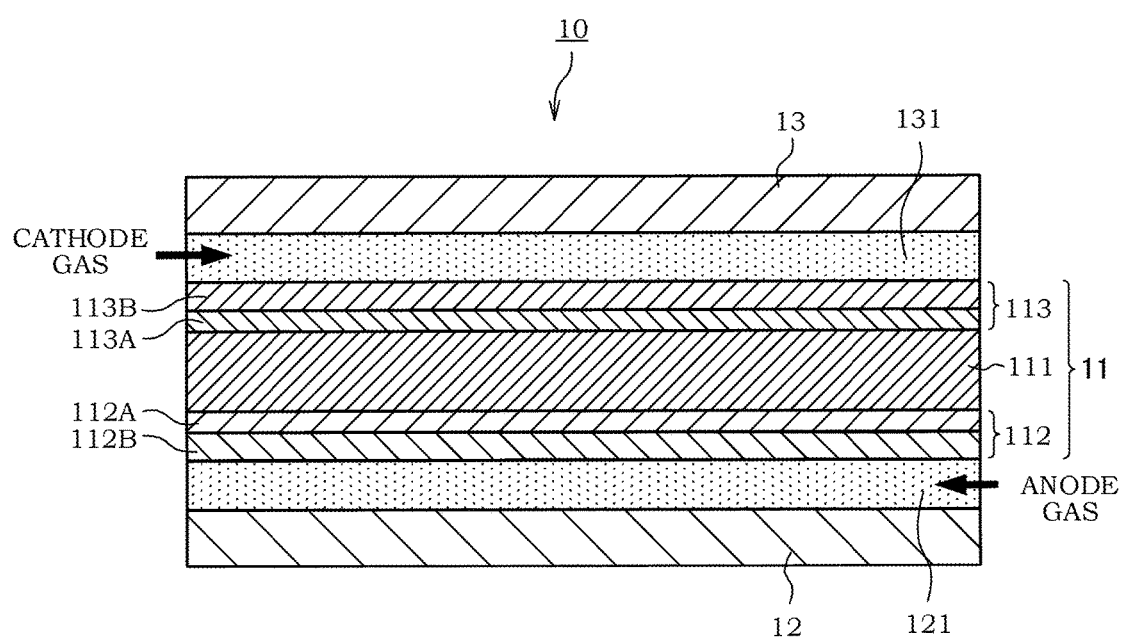
FIG. 2 is a sectional view taken along II-II of the fuel cell of FIG. 1.

FIGS. 1 and 2 are views showing a configuration of a fuel cell 10 according to one embodiment of the present invention. FIG. 1 is a perspective view of the fuel cell 10. FIG. 2 is a sectional view taken along II-II of the fuel cell 10 of FIG. 1.

As shown in FIGS. 1 and 2, the fuel cell 10 includes a membrane electrode assembly (MEA) 11, and an anode separator 12 and a cathode separator 13 arranged to sandwich the MEA 11.

The MEA 11 is composed of an electrolyte membrane 111, an anode electrode 112 and a cathode electrode 113. The MEA 11 includes the anode electrode 112 on one surface of the electrolyte membrane 111 and the cathode electrode 113 on the other surface side.

The electrolyte membrane 111 is a proton conductive ion exchange membrane formed of fluororesin. The electrolyte membrane 111 exhibits good electrical conductivity at a proper degree of wetness.

The anode electrode 112 includes a catalyst layer 112A and a gas diffusion layer 112B. The catalyst layer 112A is a member formed of platinum or carbon black particles carrying platinum or the like and provided in contact with the electrolyte membrane 111. The gas diffusion layer 112B is arranged on the outer side of the catalyst layer 112A. The gas diffusion layer 112B is a member formed of carbon cloth having gas diffusion property and electrical conductivity and provided in contact with the catalyst layer 112A and the anode separator 12.

Similarly to the anode electrode 112, the cathode electrode 113 also includes a catalyst layer 113A and a gas diffusion layer 113B. The catalyst layer 113A is arranged between the electrolyte membrane 111 and the gas diffusion layer 113B and the gas diffusion layer 113B is arranged between the catalyst layer 113A and the cathode separator 13.

The anode separator 12 is arranged on the outer side of the gas diffusion layer 112B. The anode separator 12 includes a plurality of anode gas flow passages 121 for supplying anode gas (hydrogen gas) to the anode electrode 112. The anode gas flow passages 121 are formed as groove-like passages.

The cathode separator 13 is arranged on the outer side of the gas diffusion layer 113B. The cathode separator 13 includes a plurality of cathode gas flow passages 131 for supplying cathode gas (air) to the cathode electrode 113. The cathode gas flow passages 131 are formed as groove-like passages.

As shown in FIG. 2, the anode separator 12 and the cathode separator 13 are so configured that the anode gas flowing in the anode gas flow passages 121 and the cathode gas flowing in the cathode gas flow passages 131 flow in directions opposite to each other. It should be noted that the anode separator 12 and the cathode separator 13 may be configured such that these gases flow in the same direction.

In a case of using such a fuel cell 10 as a power source for an automotive vehicle, a fuel cell stack 1 in which several hundreds of fuel cells 10 are laminated is configured. This is because required electric power is large. Electric power for driving the vehicle is taken out by configuring a fuel cell system 100 for supplying anode gas and cathode gas to the fuel cell stack 1.

Figure 3:
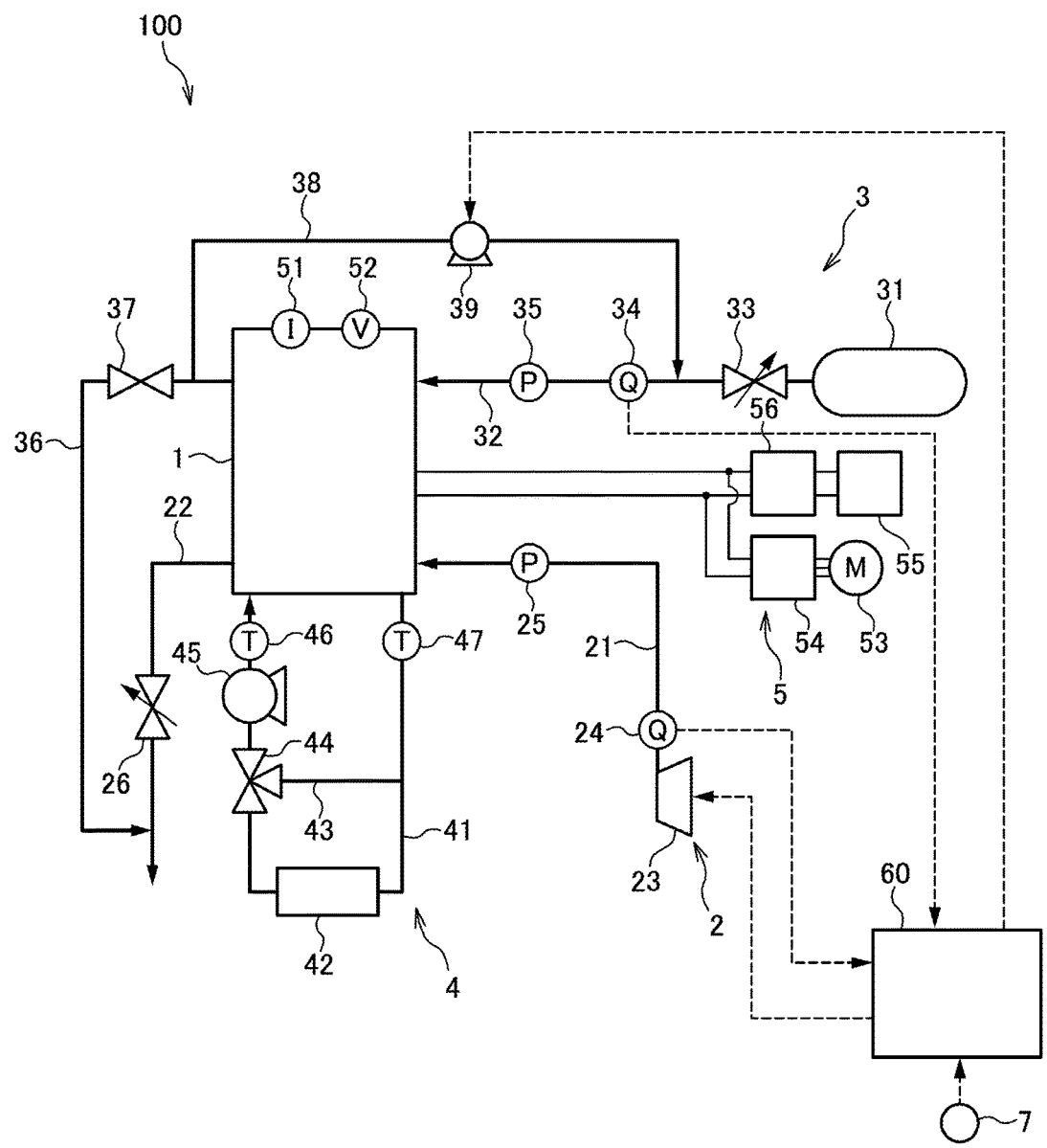
FIG. 3 is a schematic configuration diagram of a fuel cell system according to the embodiment of the present invention.

FIG. 3 is a schematic configuration diagram of the fuel cell system 100 according to one embodiment of the present invention.

The fuel cell system 100 includes the fuel cell stack 1, a cathode gas supplying/discharging device 2, an anode gas supplying/discharging device 3, a stack cooling device 4, an electric power system 5 and a controller 60.

The fuel cell stack 1 is a battery formed by laminating a plurality of fuel cells 10. The fuel cell stack 1 generates electric power necessary for travelling of a vehicle while receiving supplies of the anode gas and the cathode gas.

The cathode gas supplying/discharging device 2 includes a cathode gas supply passage 21, a cathode gas discharge passage 22, a cathode compressor 23, a cathode flow rate sensor 24, a cathode pressure sensor 25, and a cathode pressure regulating valve 26. The cathode gas supplying/discharging device 2 supplies the cathode gas to the fuel cell stack 1 and discharges a cathode off-gas discharged from the fuel cell stack 1 to the outside.

The cathode gas supply passage 21 is a passage in which the cathode gas to be supplied to the fuel cell stack 1 flows. One end of the cathode gas supply passage 21 is connected to the cathode compressor 23, and the other end thereof is connected to a cathode gas inlet part of the fuel cell stack 1.

The cathode gas discharge passage 22 is a passage in which the cathode off-gas discharged from the fuel cell stack 1 flows. One end of the cathode gas discharge passage 22 is connected to a cathode gas outlet part of the fuel cell stack 1, and the other end thereof is formed as an opening end. The cathode off-gas is mixture gas containing the cathode gas, steam produced by the electrode reaction and the like.

The cathode compressor 23 is provided on the tip of the cathode gas supply passage 21. The cathode compressor 23 takes in air as the cathode gas and supplies the cathode gas to the fuel cell stack 1.

The cathode flow rate sensor 24 is provided downstream of the cathode compressor 23 in the cathode gas supply passage 21. The cathode flow rate sensor 24 detects a flow rate of the cathode gas to be supplied to the fuel cell stack 1.

The cathode pressure sensor 25 is provided downstream of the cathode flow rate sensor 24 in the cathode gas supply passage 21. The cathode pressure sensor 25 is arranged near the cathode gas inlet part of the fuel cell stack 1. The cathode pressure sensor 25 detects a pressure of the cathode gas to be supplied to the fuel cell stack 1. The cathode gas pressure detected by the cathode pressure sensor 25 represents a pressure of an entire cathode system including the cathode gas flow passages 131 of the fuel cell stack 1 and the like.

The cathode pressure regulating valve 26 is provided in the cathode gas discharge passage 22. The cathode pressure regulating valve 26 is controlled to open and close by the controller 60, and adjusts the pressure of the cathode gas to be supplied to the fuel cell stack 1.

Next, the anode gas supplying/discharging device 3 will be described.

The anode gas supplying/discharging device 3 supplies the anode gas to the fuel cell stack 1, and discharges an anode off-gas discharged from the fuel cell stack 1 to the cathode gas discharge passage 22. The anode gas supplying/discharging device 3 includes a high-pressure tank 31, an anode gas supply passage 32, an anode pressure regulating valve 33, an anode flow rate sensor 34, an anode pressure sensor 35, an anode gas discharge passage 36, and a purge valve 37. Moreover, the anode gas supplying/discharging device 3 includes a recirculation passage 38 connecting the anode gas supply passage 32 to the anode gas discharge passage 36, and a recirculation pump 39 installed in the recirculation passage 38.

The high-pressure tank 31 is a container for storing the anode gas to be supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31, and the other end thereof is connected to an anode gas inlet part of the fuel cell stack 1.

The anode pressure regulating valve 33 is provided downstream of the high-pressure tank 31 in the anode gas supply passage 32. The anode pressure regulating valve 33 is controlled to open and close by the controller 60, and adjusts a pressure of the anode gas to be supplied to the fuel cell stack 1.

The anode gas discharge passage 36 is a passage in which the anode off-gas discharged from the fuel cell stack 1 flows. One end of the anode gas discharge passage 36 is connected to an anode gas outlet part of the fuel cell stack 1, and the other end thereof is connected to a part of the cathode gas discharge passage 22 downstream of the cathode pressure regulating valve 26.

The purge valve 37 is provided in the anode gas discharge passage 36. The purge valve 37 is controlled to open and close by the controller 60, and controls a purge flow rate of the anode off-gas discharged from the anode gas discharge passage 36 to the cathode gas discharge passage 22.

When a purge control is carried out such that the purge valve 37 becomes an open state, the anode off-gas is discharged to the outside through the anode gas discharge passage 36 and the cathode gas discharge passage 22. At this time, the anode off-gas is mixed with the cathode off-gas in the cathode gas discharge passage 22. By mixing the anode off-gas and the cathode off-gas and discharging them to the outside in this manner, a hydrogen concentration in the mixture gas is set at a value not larger than a discharge allowable concentration.

The recirculation passage 38 is a passage for flowing the anode off-gas in the anode gas discharge passage 36 to the anode gas supply passage 32. One end of the recirculation passage 38 is connected to a part of the anode gas discharge passage 36 between the anode gas outlet part and the purge valve 37, and the other end thereof is connected to a part of the anode gas supply passage 32 between the anode gas inlet part and the anode pressure regulating valve 33.

The recirculation pump 39 is provided in the recirculation passage 38. The recirculation pump 39 recirculates the anode off-gas discharged from the fuel cell stack 1 to the anode gas supply passage 32 through the recirculation passage 38. Thus, the recirculation passage 38 and the recirculation pump 39 constitute a circulation mechanism for supplying the anode off-gas discharged from the fuel cell stack 1 again to the fuel cell stack 1.

The anode flow rate sensor 34 is provided downstream of a connected part to the recirculation passage 38 in the anode gas supply passage 32. The anode flow rate sensor 34 detects a circulation flow rate of the anode gas to be supplied to the fuel cell stack 1.

The anode pressure sensor 35 is provided downstream of the anode flow rate sensor 34 in the anode gas supply passage 32. The anode pressure sensor 35 detects a pressure of the anode gas to be supplied to the fuel cell stack 1. The anode gas pressure detected by the anode pressure sensor 35 represents a pressure of an entire anode system including the anode gas flow passages 121 and the like of the fuel cell stack 1.

The stack cooling device 4 is a temperature adjusting device for cooling the fuel cell stack 1 by cooling water such as antifreeze and adjusting the fuel cell stack 1 to a temperature suitable for power generation. The stack cooling device 4 includes a circulation passage 41, a radiator 42, a bypass passage 43, a three-way valve 44, a circulation pump 45, an inlet water temperature sensor 46, and an outlet water temperature sensor 47.

The circulation passage 41 is configured as a looped passage in which the cooling water is circulated. One end of the circulation passage 41 is connected to a cooling water inlet part of the fuel cell stack 1, and the other end thereof is connected to a cooling water outlet part of the fuel cell stack 1.

The radiator 42 is provided in the circulation passage 41. The radiator 42 is a heat exchanger for radiating the heat of the cooling water discharged from the fuel cell stack 1 to the outside.

The bypass passage 43 is a passage in which the cooling water flows while bypassing the radiator 42. One end of the bypass passage 43 is connected to a part of the circulation passage 41 upstream of the radiator 42, and the other end thereof is connected to the three-way valve 44 provided downstream of the radiator 42 in the circulation passage 41.

The three-way valve 44 switches a circulation route of the cooling water in accordance with the temperature of the cooling water. Specifically, if the temperature of the cooling water is higher than a predetermined temperature, the three-way valve 44 is so switched that the cooling water discharged from the fuel cell stack 1 is supplied to the fuel cell stack 1 again through the radiator 42. To the contrary, if the temperature of the cooling water is lower than the predetermined temperature, the three-way valve 44 is so switched that the cooling water discharged from the fuel cell stack 1 is supplied to the fuel cell stack 1 again after flowing along the bypass passage 43.

The circulation pump 45 is provided downstream of the three-way valve 44 in the circulation passage 41, and circulates the cooling water.

The inlet water temperature sensor 46 is provided near the cooling water inlet part of the fuel cell stack 1 in the circulation passage 41, and the outlet water temperature sensor 47 is provided near the cooling water outlet part of the fuel cell stack 1 in the circulation passage 41. The inlet water temperature sensor 46 detects the temperature of the cooling water flowing into the fuel cell stack 1, and the outlet water temperature sensor 47 detects the temperature of the cooling water discharged from the fuel cell stack 1. An average water temperature calculated from the inlet water temperature detected by the inlet water temperature sensor 46 and the outlet water temperature detected by the outlet water temperature sensor 47 is used as an internal temperature of the fuel cell stack 1, that is, a so-called stack temperature.

The electric power system 5 includes a current sensor 51, a voltage sensor 52, a travel motor 53, an inverter 54, a battery 55, and a DC/DC converter 56.

The current sensor 51 detects an output current extracted from the fuel cell stack 1. The voltage sensor 52 detects an output voltage of the fuel cell stack 1, that is, an inter-terminal voltage of the fuel cell stack 1.

The travel motor 53 is a three-phase alternating-current synchronous motor and a drive source for driving wheels. The travel motor 53 has a function as an electric motor to be rotationally driven while receiving the supply of electric power from the fuel cell stack 1 and the battery 55, and a function as a generator for generating electric power by being rotationally driven by an external force.

The inverter 54 is composed of a plurality of semiconductor switches such as IGBTs. The semiconductor switches of the inverter 54 are switching-controlled by the controller 60, thereby converting direct-current power into alternating-current power or alternating-current power into direct-current power. The inverter 54 converts composite direct-current power of output electric power of the fuel cell stack 1 and output electric power of the battery 55 into three-phase alternating-current power, and supplies it to the travel motor 53 when the travel motor 53 functions as the electric motor. To the contrary, the inverter 54 converts regenerative alternating-current power of the travel motor 53 into direct-current power, and supplies it to the battery 55 when the travel motor 53 functions as the generator.

The battery 55 is configured to be charged with a surplus of the output electric power of the fuel cell stack 1 and regenerative electric power of the travel motor 53. The electric power charged into the battery 55 is supplied to auxiliary machines such as the cathode compressor 23 and the travel motor 53 if necessary.

The DC/DC converter 56 is a bidirectional voltage converter for increasing and decreasing the output voltage of the fuel cell stack 1. By controlling the output voltage of the fuel cell stack 1 by the DC/DC converter 56, the output current of the fuel cell stack 1 and the like are adjusted.

The controller 60 is configured by a microcomputer including a central processing unit (CPU), a read-only memory (ROM), a random access memory (RAM), and an input/output interface (I/O interface). To the controller 60 are input signals from sensors for detecting a vehicle driving state such as an accelerator stroke sensor 7 for detecting a depressed amount of an accelerator pedal besides signals from various sensors such as the cathode flow rate sensor 24 and the anode flow rate sensor 34.

In accordance with the operating state of the fuel cell system 100, the controller 60 adjusts the pressure and the circulation flow rate of the anode gas by controlling the anode pressure regulating valve 33 and the recirculation pump 39, and adjusts the pressure and the flow rate of the cathode gas by controlling the cathode pressure regulating valve 26 and the cathode compressor 23.

Further, the controller 60 calculates target output electric power of the fuel cell stack 1 on the basis of the operating state of the fuel cell system 100. The controller 60 calculates the target output electric power on the basis of electric power required by the travel motor 53, electric power required by the auxiliary machines, charge/discharge requests of the battery 55 and the like. The controller 60 calculates a target output current of the fuel cell stack 1 on the basis of the target output electric power by referring to a current-voltage characteristic of the fuel cell stack 1 determined in advance. Then, the controller 60 controls the output voltage of the fuel cell stack 1 using the DC/DC converter 56 such that the output current of the fuel cell stack 1 reaches the target output current.

In the fuel cell stack 1 of the fuel cell system 100 described above, if the degree of wetness (water content) of the electrolyte membrane 111 of each fuel cell 10 becomes too high or too low, power generation performance is lowered. To cause the fuel cell stack 1 to effectively generate electric power, it is important to maintain the electrolyte membranes 111 of the fuel cell stack 1 at a proper degree of wetness. Thus, in the fuel cell system 100, the cathode gas flow rate and the anode gas circulation flow rate are controlled so that the fuel cell stack 1 is in a wet state suitable for power generation.

The cathode gas flow rate control is carried out mainly by the cathode compressor 23, and the cathode compressor 23 functions as a cathode gas flow rate control unit configured to control the cathode gas flow rate in accordance with a target cathode gas flow rate. Further, the anode gas circulation flow rate control is carried out mainly by the recirculation pump 39, and the recirculation pump 39 functions as an anode gas flow rate control unit configured to control the anode gas circulation flow rate in accordance with a target anode gas circulation flow rate.

For example, in a case of increasing the cathode gas flow rate, moisture discharged from the fuel cell stack 1 increases together with an increase in the cathode gas. For this reason, the degree of wetness of the electrolyte membranes 111 is reduced. This makes it possible to adjust the degree of wetness of the fuel cell stack 1 to a dry side. To the contrary, in a case of decreasing the cathode gas flow rate, moisture discharged from the fuel cell stack 1 decreases together with a decrease in the cathode gas. For this reason, the degree of wetness of the electrolyte membranes 111 increases. This makes it possible to adjust the degree of wetness of the fuel cell stack 1 to a wet side.

On the other hand, the anode gas is humidified by moisture leaking from downstream sides of the cathode gas flow passages 131 (see FIG. 2) via the electrolyte membranes 111. In a case where the circulation flow rate of the anode gas to be humidified is increased in this manner, then moisture contained in the anode gas easily spreads from the upstream sides to the downstream sides of the anode gas flow passages 121 (see FIG. 2), and the degree of wetness of the electrolyte membranes 111 of the fuel cell stack 1 can be enhanced. This makes it possible to adjust the degree of wetness of the fuel cell stack 1 to the wet side. To the contrary, in a case of decreasing the anode gas circulation flow rate, the degree of wetness of the electrolyte membranes 111 is reduced. This makes it possible to adjust the degree of wetness of the fuel cell stack 1 to the dry side.

It should be noted that the fuel cell system 100 may be configured so as to adjust the degree of wetness of the fuel cell stack 1 by not only controlling the cathode gas flow rate and the anode gas circulation flow rate, but also controlling the cathode gas pressure, the cooling water temperature and the like.

Here, the inventors of this present application found out that, concerning the wetness control of the fuel cell stack 1, the degree of wetness of the fuel cell stack 1 could be hardly adjusted by the anode gas circulation flow rate control even if the anode gas circulation flow rate was changed when the cathode gas flow rate was high.

Figure 4:
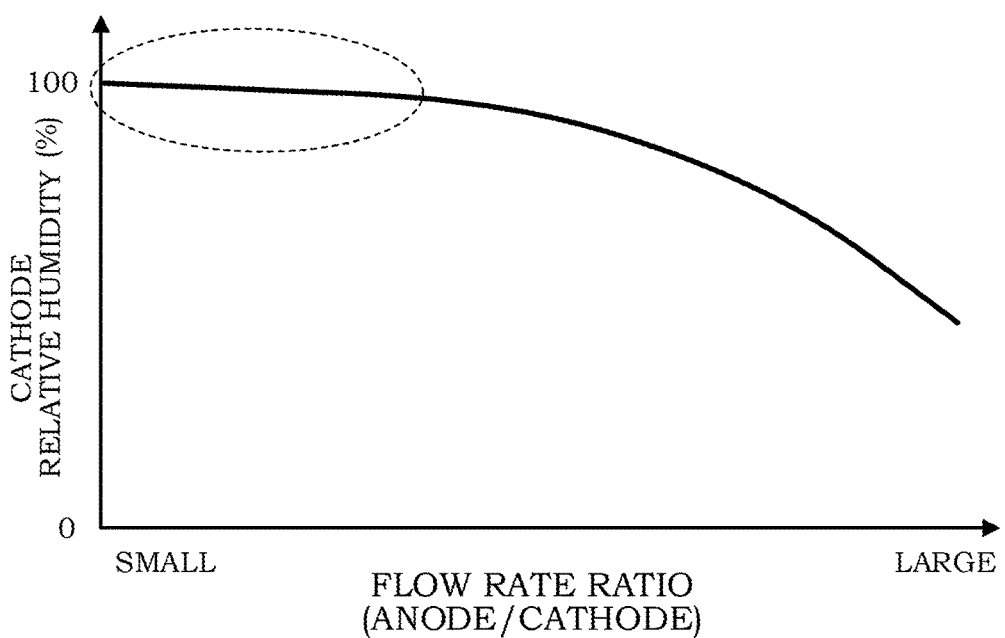
FIG. 4 is a characteristic diagram showing a relationship of a flow rate ratio of anode gas and cathode gas and a relative humidity of the cathode gas discharged from a fuel cell stack.

FIG. 4 is a characteristic diagram showing a relationship between a flow rate ratio of the anode gas and the cathode gas and a relative humidity of the cathode gas discharged from the fuel cell stack 1. The cathode gas relative humidity is an index indicating moisture content in the cathode gas discharged from the fuel cell stack 1. As the cathode gas relative humidity decreases, the electrolyte membranes 111 of the fuel cell stack 1 become wetter. The inventors of the present application found out a relationship as shown in FIG. 4 between the cathode gas relative humidity and a flow rate ratio obtained by dividing the anode gas flow rate (circulation flow rate) by the cathode gas flow rate.

In other words, in a case of carrying out the wetness control on the basis of the anode gas circulation flow rate control, the cathode gas relative humidity hardly changes, and the degree of wetness of the fuel cell stack 1 can thus be hardly adjusted in a region where the anode gas circulation flow rate is low and the flow rate ratio is small (broken line region). To the contrary, in a region where the flow rate ratio is large, the cathode gas relative humidity can be changed in accordance with the flow rate ratio, and the degree of wetness of the fuel cell stack 1 can thus be adjusted. According to the finding of the inventors of the present application, the flow rate ratio needs to be set large, for example, by maximally suppressing the cathode gas flow rate in a case of adjusting the degree of wetness of the fuel cell stack 1 by controlling the anode gas circulation flow rate.

Accordingly, the fuel cell system 100 is configured to be able to properly control the degree of wetness of the fuel cell stack 1 by controlling the anode gas circulation flow rate and the cathode gas flow rate on the basis of the finding described above.

The anode gas circulation flow rate and the cathode gas flow rate are controlled on the basis of the target anode gas circulation flow rate and the target cathode gas flow rate calculated by the controller 60 in accordance with the operating state of the fuel cell stack 1. Then, the recirculation pump 39 controls the flow rate of the anode gas to be supplied to the fuel cell stack 1 in accordance with the target anode gas circulation flow rate, and the cathode compressor 23 controls the flow rate of the cathode gas to be supplied to the fuel cell stack 1 in accordance with the target cathode gas flow rate.

Figure 5:
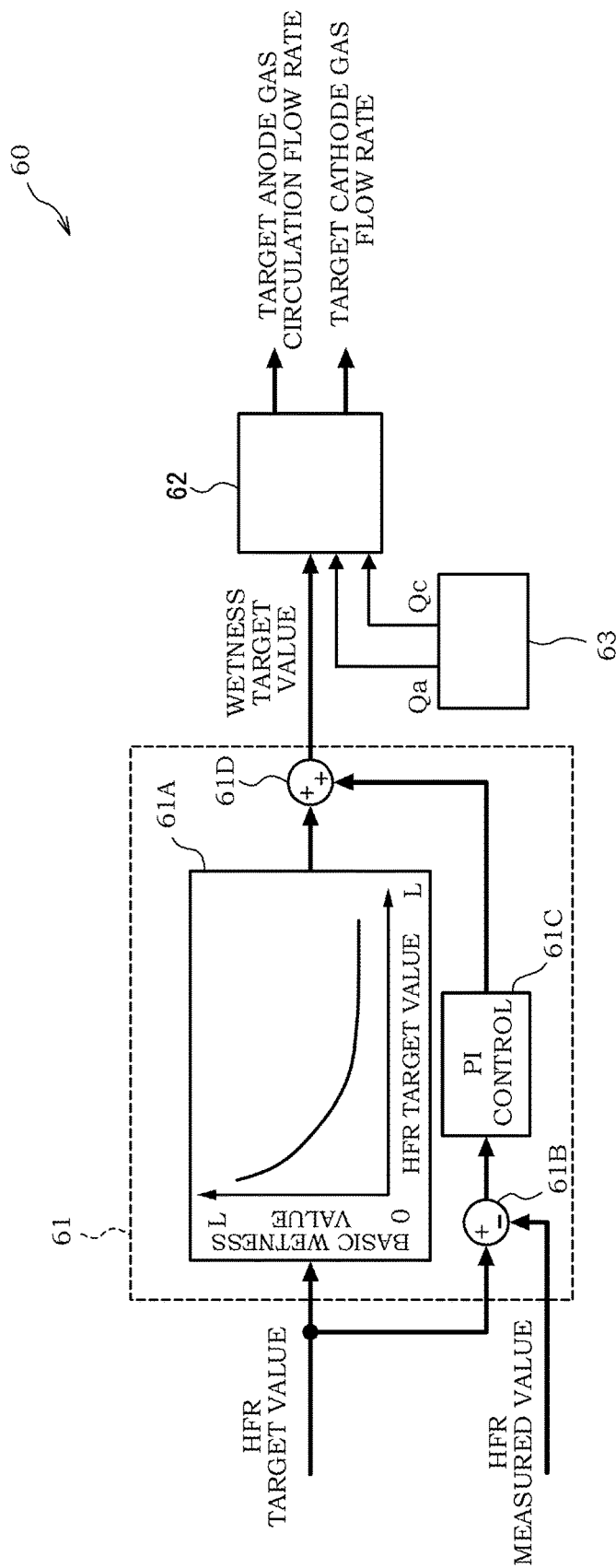
FIG. 5 is a block diagram showing the configuration of a controller provided in the fuel cell system.

Next, gas flow rate calculation processes carried out by the controller 60 will be described with reference to FIG. 5. FIG. 5 is a block diagram showing the configuration of the controller 60 provided in the fuel cell system 100.

As shown in FIG. 5, the controller 60 includes a wetness target value calculating unit 61 for calculating a wetness target value, which is a target value of a wet state of the fuel cell stack 1, a gas required flow rate calculating unit 63 for calculating a cathode gas required flow rate and an anode gas required circulation flow rate on the basis of the power generation request to the fuel cell stack 1, and a gas flow rate calculating unit 62 for calculating the target anode gas circulation flow rate and the target cathode gas flow rate on the basis of the wetness target value and these required flow rates.

The wetness target value calculating unit 61 is composed of a basic wetness value calculating unit 61A, a subtraction unit 61B, a PI control execution unit 61C, and an addition unit 61D.

The basic wetness value calculating unit 61A calculates a basic wetness value on the basis of a target value of an internal impedance (HFR) of the fuel cell stack 1. The basic wetness value is set at a smaller value as the HFR target value increases.

It should be noted that there is a correlation between the internal impedance (HFR) of the fuel cell stack 1 and the degree of wetness of the electrolyte membranes 111 of the fuel cell stack 1. The internal impedance of the fuel cell stack 1 has a larger value as the degree of wetness decreases, that is, as the electrolyte membranes 111 become drier. The HFR target value is set at a smaller value as a power generation load of the fuel cell stack 1 increases. Further, the HFR target value is corrected to be a smaller value as the stack temperature increases when the power generation load of the fuel cell stack 1 is the same.

The subtraction unit 61B calculates a difference between the HFR target value and an HFR measured value (HFR deviation) by subtracting a measured value of the internal impedance of the fuel cell stack 1 from the HFR target value. The HFR measured value is calculated on the basis of the output current of the fuel cell stack 1 detected by the current sensor 51 and the output voltage of the fuel cell stack 1 detected by the voltage sensor 52.

The PI control execution unit 61C calculates a feedback correction value on the basis of the HFR deviation calculated by the subtraction unit 61B.

The addition unit 61D calculates the wetness target value by adding the basic wetness value and the feedback correction value. The wetness target value is equivalent to a target value of the degree of wetness of the fuel cell stack 1, and the wetness control of the fuel cell stack 1 is carried out in accordance with this wetness target value.

Thus, the wetness target value calculating unit 61 is configured to calculate the wetness target value on the basis of the HFR target value and the HFR measured value. A calculation method of the wetness target value by the wetness target value calculating unit 61 is just one example, and the wetness target value may be calculated using another technique.

The gas required flow rate calculating unit 63 calculates a cathode gas required flow rate Qc (see FIG. 8) and an anode gas required circulation flow rate Qa (see FIG. 9) on the basis of the power generation request to the fuel cell stack 1.

The gas flow rate calculating unit 62 calculates the target anode gas circulation flow rate and the target cathode gas flow rate on the basis of these required flow rates and the wetness target value calculated by the wetness target value calculating unit 61. The gas flow rate calculating unit 62 calculates the target anode gas circulation flow rate and the target cathode gas flow rate such that the degree of wetness of the fuel cell stack 1 reaches a state suitable for an operation state.

Next, calculation processes of the target anode gas circulation flow rate and the target cathode gas flow rate during the dry control carried out by the gas flow rate calculating unit 62 of the controller 60 will be described with reference to FIGS. 6 to 10.

Figure 6:
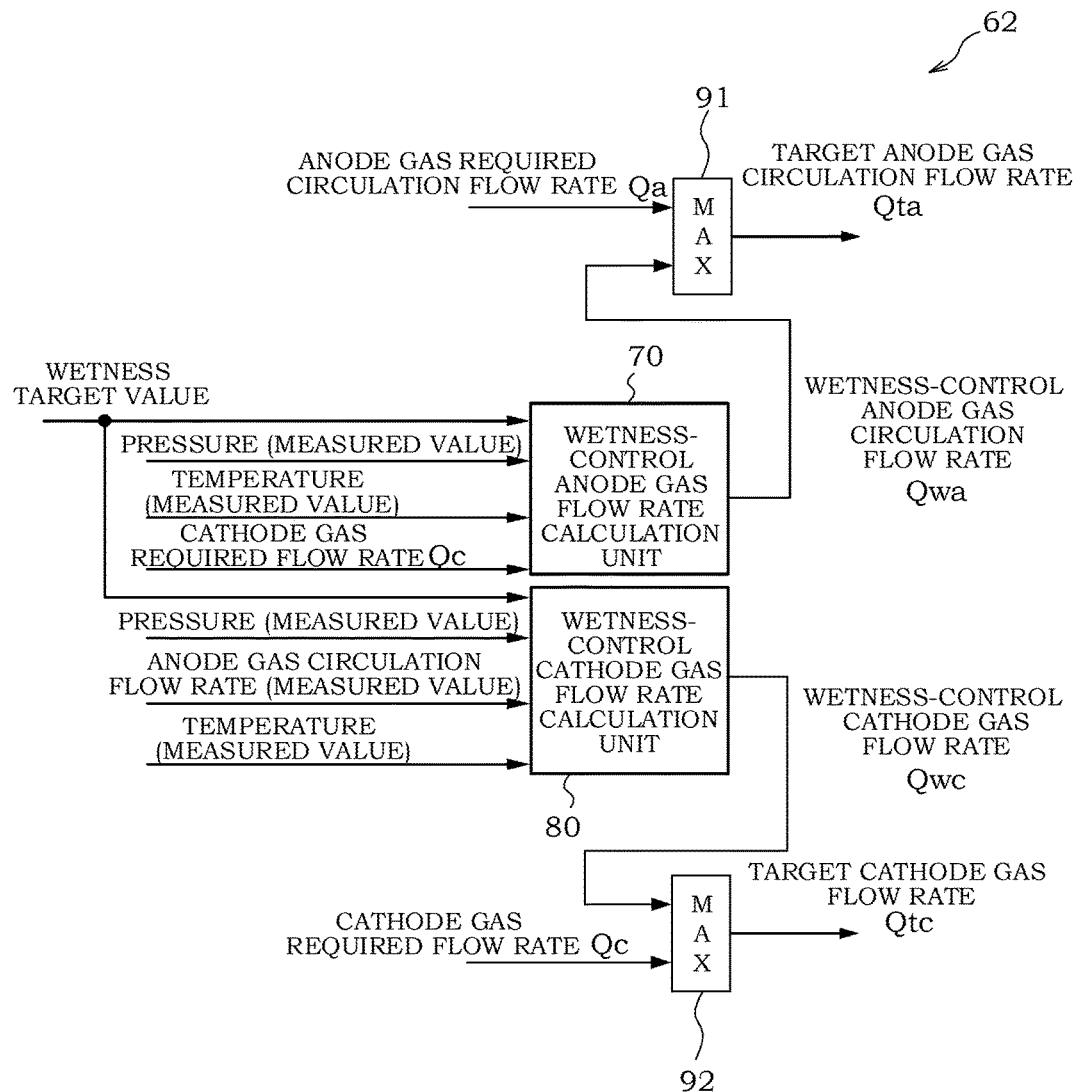
FIG. 6 is a diagram showing calculation processes of a target anode gas circulation flow rate and a target cathode gas flow rate in a gas flow rate calculating unit during a dry control.
Figure 7:
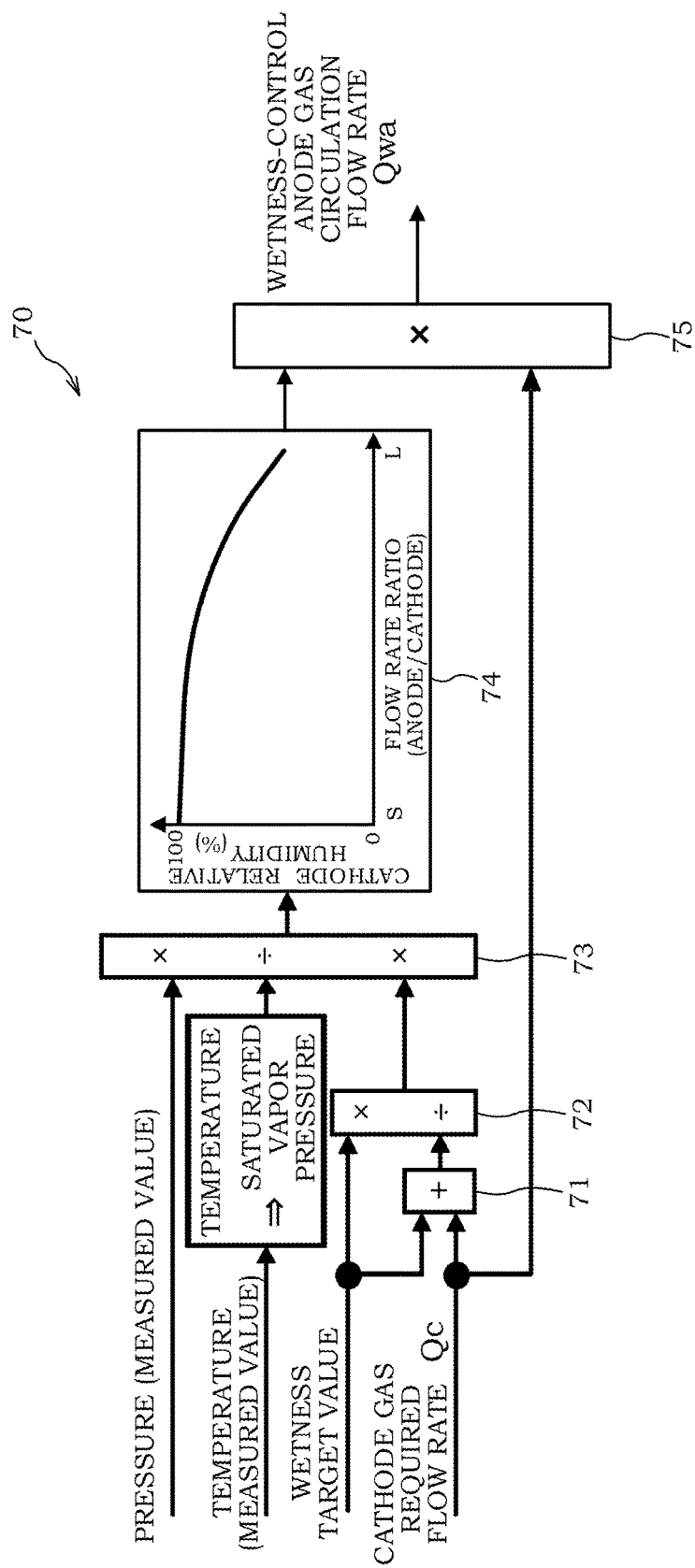
FIG. 7 is a diagram showing calculation processes in a wetness-control anode gas flow rate calculating unit during the dry control.
Figure 8:
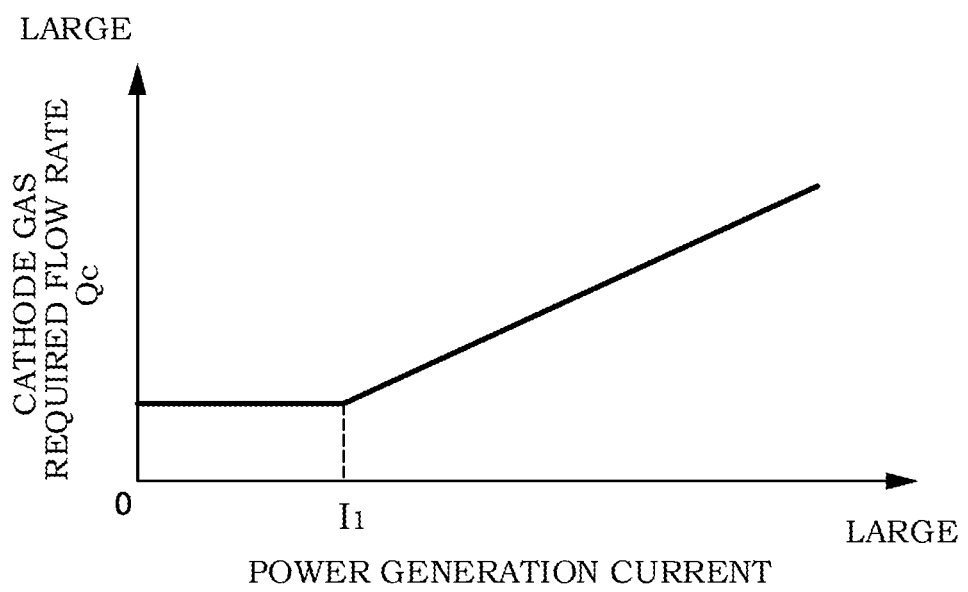
FIG. 8 is a characteristic diagram of a cathode gas required flow rate on the basis of a power generation request to the fuel cell stack.
Figure 9:
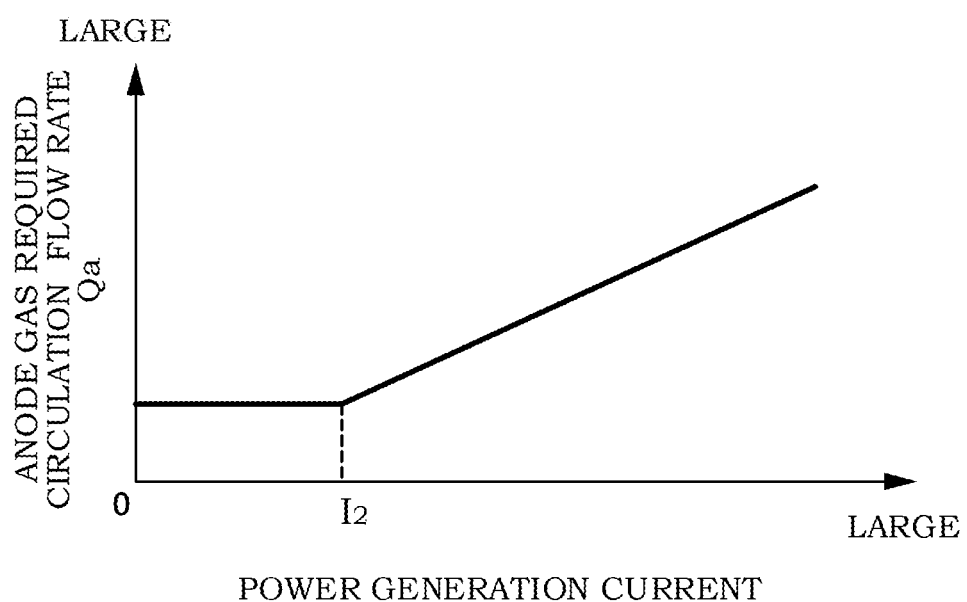
FIG. 9 is a characteristic diagram of an anode gas required circulation flow rate on the basis of the power generation request to the fuel cell stack.
Figure 10:
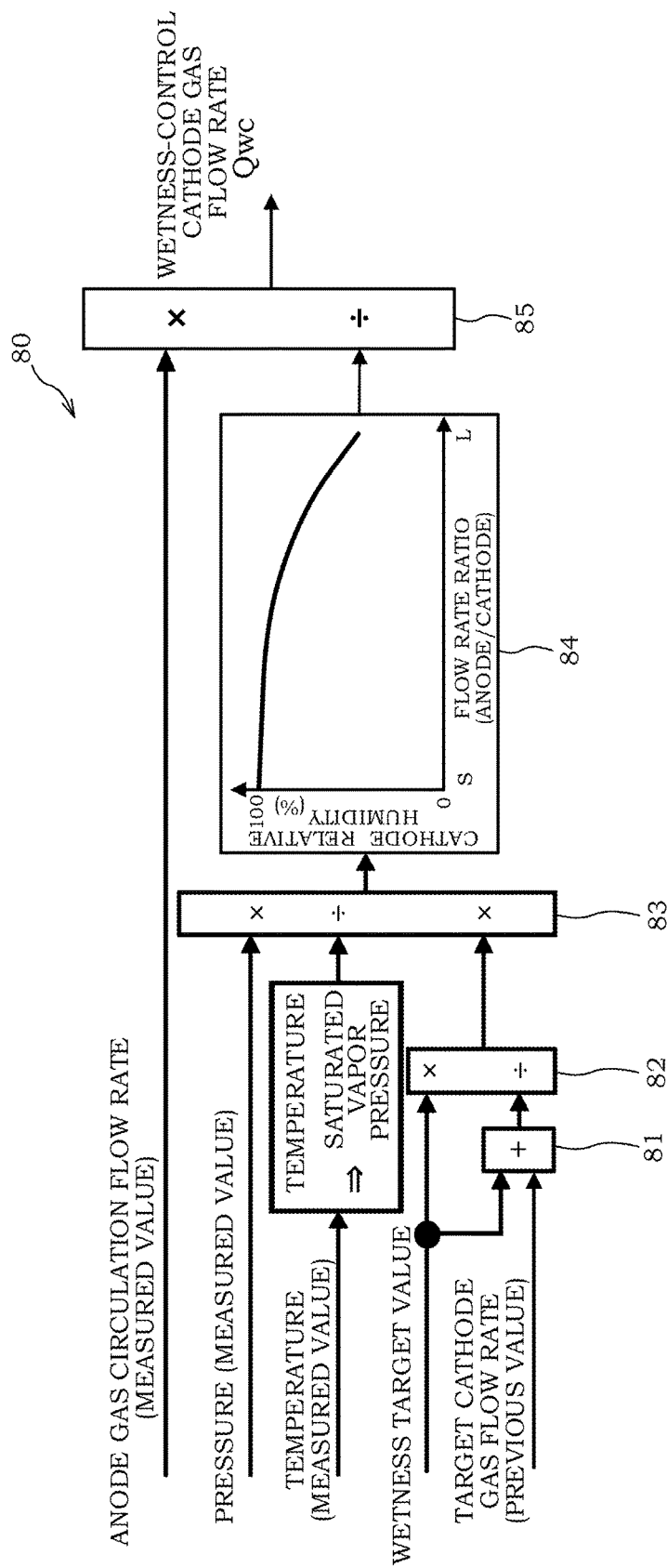
FIG. 10 is a diagram showing calculation processes in a wetness-control cathode gas flow rate calculating unit during the dry control.

FIG. 6 is a diagram showing the calculation processes of the target anode gas circulation flow rate and the target cathode gas flow rate in the gas flow rate calculating unit 62 during the dry control. FIG. 7 is a diagram showing calculation processes in a wetness-control anode gas flow rate calculating unit 70. FIG. 8 is a characteristic diagram of the cathode gas required flow rate Qc on the basis of the power generation request to the fuel cell stack 1. FIG. 9 is a characteristic diagram of the anode gas required circulation flow rate Qa on the basis of the power generation request to the fuel cell stack 1. FIG. 10 is a diagram showing calculation processes in a wetness-control cathode gas flow rate calculating unit 80.

As shown in FIG. 6, the gas flow rate calculating unit 62 of the controller 60 is composed of the wetness-control anode gas flow rate calculating unit 70, a target anode gas flow rate setting unit 91, the wetness-control cathode gas flow rate calculating unit 80, and a target cathode gas flow rate setting unit 92.

During the dry control of reducing the degree of wetness of the fuel cell stack 1, the wetness-control anode gas flow rate calculating unit 70 calculates a wetness-control anode gas circulation flow rate Qwa on the basis of the wetness target value calculated by the wetness target value calculating unit 61, a measured value of the cathode gas pressure, a measured value of the cooling water temperature, and the cathode gas required flow rate Qc. It should be noted that the controller 60 judges whether the dry control or the wet control is carried out, for example, by comparing the present wetness target value with the previous value.

As shown in FIG. 7, the wetness-control anode gas flow rate calculating unit 70 includes an addition unit 71, a division unit 72, a cathode gas relative humidity calculating unit 73, a flow rate ratio calculating unit 74, and the multiplication unit 75.

The wetness-control anode gas flow rate calculating unit 70 calculates a cathode gas wet state value by adding the wetness target value and the cathode gas required flow rate Qc obtained from FIG. 8 in the addition unit 71 and dividing the wetness target value by this addition value in the division unit 72.

The cathode gas required flow rate Qc used in the calculation of the wetness-control anode gas circulation flow rate Qwa is calculated in accordance with the power generation request to the fuel cell stack 1 obtained on the basis of the vehicle driving state, that is, the power generation current extracted from the fuel cell stack 1 by referring to the characteristic diagram shown in FIG. 8.

As shown in FIG. 8, the cathode gas required flow rate Qc becomes a fixed value when the power generation current is in a range from 0 to $I_1$, and becomes a value that increases with an increase of the power generation current when it is in a range of $I_1$ or higher. The cathode gas required flow rate Qc is specified in accordance with the power generation request to the fuel cell stack 1 and specified, for example, as a cathode gas flow rate minimum necessary when the fuel cell stack 1 generates electric power in a normal state. This normal state includes a state where the occurrence of flooding is prevented, a state where the rotation speed of the cathode compressor 23 does not fall below a minimum rotation speed and other states besides a state where the degree of wetness of the fuel cell stack 1 is controlled within a proper range.

The cathode gas relative humidity calculating unit 73 of the wetness-control anode gas flow rate calculating unit 70 calculates the cathode gas relative humidity by multiplying the measured value of the cathode gas pressure and the cathode gas wet state value calculated by the division unit 72 and dividing that multiplication value by a saturated vapor pressure obtained from the measured value of the cooling water temperature. The cathode gas relative humidity is an index indicating the moisture content in the cathode gas discharged from the fuel cell stack 1 as described with reference to FIG. 4.

It should be noted that the measured value of the cathode gas pressure used in the cathode gas relative humidity calculating unit 73 is calculated on the basis of a detection value of the cathode pressure sensor 25, and the measured value of the cooling water temperature is calculated on the basis of detection values of the inlet water temperature sensor 46 and the outlet water temperature sensor 47. Further, estimated values of the cathode gas pressure and the cooling water temperature may be used instead of using the measured values of the cathode gas pressure and the cooling water temperature.

The flow rate ratio calculating unit 74 calculates the flow rate ratio necessary for the wetness control on the basis of the cathode gas relative humidity calculated by the cathode gas relative humidity calculating unit 73 by referring to a flow rate ratio-cathode gas relative humidity characteristic map described with reference to FIG. 4. The flow rate ratio calculated by the flow rate ratio calculating unit 74 is a ratio of the anode gas circulation flow rate to the cathode gas flow rate.

The multiplication unit 75 calculates the wetness-control anode gas circulation flow rate Qwa by multiplying the flow rate ratio calculated by the flow rate ratio calculating unit 74 and the cathode gas required flow rate Qc used in the addition unit 71.

It should be noted that the wetness-control anode gas flow rate calculating unit 70 may be configured to calculate the cathode gas relative humidity from the wetness target value and the cathode gas required flow rate without using the cathode gas pressure and the cooling water temperature, and calculate the wetness-control anode gas circulation flow rate using the cathode gas relative humidity.

As shown in FIG. 6, the gas flow rate calculating unit 62 compares the wetness-control anode gas circulation flow rate Qwa calculated as described above in the target anode gas flow rate setting unit 91 with the anode gas required circulation flow rate Qa obtained from the power generation request to the fuel cell stack 1, and sets the larger one of those flow rates as a target anode gas circulation flow rate Qta.

The anode gas required circulation flow rate Qa used in setting the target anode gas circulation flow rate Qta is calculated in accordance with the power generation request to the fuel cell stack 1 obtained on the basis of the vehicle driving state, that is, the power generation current extracted from the fuel cell stack 1 by referring to the characteristic diagram shown in FIG. 9.

As shown in FIG. 9, the anode gas required circulation flow rate Qa is a fixed value at the power generation current of from 0 to $I_2$ and, at $I_2$ or higher, is a value which increases with an increase of the power generation current. The anode gas required circulation flow rate Qa is specified in accordance with the power generation request to the fuel cell stack 1 and specified, for example, as an anode gas flow rate minimum necessary when the fuel cell stack 1 generates electric power in a normal state. This normal state includes the state where the occurrence of flooding is prevented, a state where the rotation speed of the recirculation pump 39 does not fall below a minimum rotation speed and other states besides the state where the degree of wetness of the fuel cell stack 1 is controlled within the proper range.

On the other hand, during the dry control, the wetness-control cathode gas flow rate calculating unit 80 calculates a wetness-control cathode gas flow rate Qwc on the basis of the wetness target value calculated by the wetness target value calculating unit 61, the measured value of the cathode gas pressure, the measured value of the cooling water temperature, and the measured value of the anode gas circulation flow rate.

As shown in FIG. 10, the wetness-control cathode gas flow rate calculating unit 80 includes an addition unit 81, a first division unit 82, a cathode gas relative humidity calculating unit 83, a flow rate ratio calculating unit 84, and a second division unit 85.

The wetness-control cathode gas flow rate calculating unit 80 calculates the cathode gas wet state value by adding the wetness target value and the previous value of the target cathode gas flow rate Qtc in the addition unit 81 and dividing the wetness target value by this addition value in the first division unit 82. For the calculation of the cathode gas wet state value, the measured value of the cathode gas flow rate may be used instead of the previous value of the target cathode gas flow rate Qtc.

The cathode gas relative humidity calculating unit 83 of the wetness-control cathode gas flow rate calculating unit 80 calculates the cathode gas relative humidity by multiplying the measured value of the cathode gas pressure and the cathode gas wet state value calculated by the first division unit 82 and dividing that multiplication value by the saturated vapor pressure obtained from the measured value of the cooling water temperature. It should be noted that the estimated values of the cathode gas pressure and the cooling water temperature may be used instead of using the measured values of the cathode gas pressure and the cooling water temperature.

The flow rate ratio calculating unit 84 calculates the flow rate ratio necessary for the wetness control on the basis of the cathode gas relative humidity calculated by the cathode gas relative humidity calculating unit 83 by referring to the flow rate ratio-cathode gas relative humidity characteristic map described with reference to FIG. 4. The flow rate ratio calculated by the flow rate ratio calculating unit 84 is a ratio of the anode gas circulation flow rate to the cathode gas flow rate.

The second division unit 85 calculates the wetness-control cathode gas flow rate Qwc by dividing the measured value of the anode gas circulation flow rate by the flow rate ratio calculated by the flow rate ratio calculating unit 84. It should be noted that the measured value of the anode gas circulation flow rate is calculated on the basis of a detection value of the anode flow rate sensor 34. Further, an estimated value of the anode gas circulation flow rate may be used instead of the measured value of the anode gas circulation flow rate.

It should be noted that the wetness-control cathode gas flow rate calculating unit 80 may be configured to calculate the cathode gas relative humidity from the wetness target value and the previous value of the target cathode gas flow rate Qtc or the measured value (estimated value) of the cathode gas flow rate without using the cathode gas pressure and the cooling water temperature, and calculate the wetness-control cathode gas flow rate using the cathode gas relative humidity.

As shown in FIG. 6, the gas flow rate calculating unit 62 compares the wetness-control cathode gas flow rate Qwc calculated as described above with the cathode gas required flow rate Qc (see FIG. 8) obtained from the power generation request to the fuel cell stack 1, and sets the larger one of those flow rates as the target cathode gas flow rate Qtc during the dry control.

Thus, in the gas flow rate calculating unit 62, the wetness-control anode gas circulation flow rate Qwa during the dry control is calculated at least on the basis of the wetness target value and the cathode gas required flow rate Qc necessary when the fuel cell stack 1 generates electric power in the normal state. On the other hand, the wetness-control cathode gas flow rate Qwc during the dry control is calculated at least on the basis of the wetness target value and the measured value or estimated value of the anode gas circulation flow rate. In other words, the wetness-control anode gas circulation flow rate and the wetness-control cathode gas flow rate during the dry control are calculated to compensate for a shortage of the dry control by the cathode gas flow rate control when the degree of wetness cannot be controlled to the dry side on the basis of the anode gas circulation flow rate control. By calculating the both gas flow rates in this manner, it is possible to prioritize the dry control by the anode gas circulation flow rate control over the dry control by the cathode gas flow rate control as described later with reference to FIG. 14.

Next, calculation processes of the target anode gas circulation flow rate and the target cathode gas flow rate during the wet control carried out by the gas flow rate calculating unit 62 of the controller 60 will be described with reference to FIGS. 11 to 13.

Figure 11:
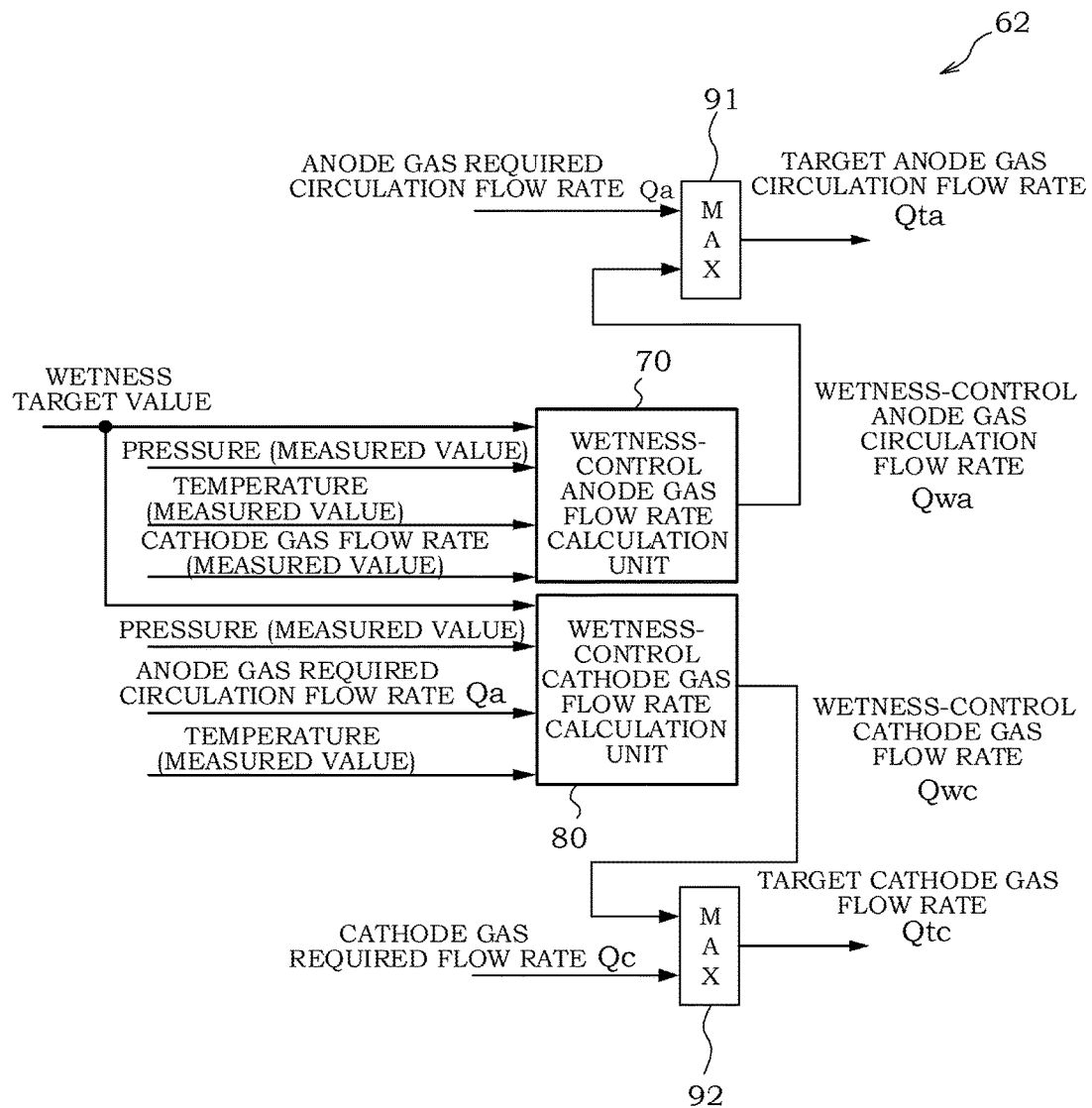
FIG. 11 is a diagram showing calculation processes of the target anode gas circulation flow rate and the target cathode gas flow rate in the gas flow rate calculating unit during a wet control.

FIG. 11 is a diagram showing the calculation processes of the target anode gas circulation flow rate and the target cathode gas flow rate during the wet control in the gas flow rate calculating unit 62. FIG. 12 is a diagram showing calculation processes in the wetness-control anode gas flow rate calculating unit 70. FIG. 13 is a diagram showing calculation processes in the wetness-control cathode gas flow rate calculating unit 80.

Figure 12:
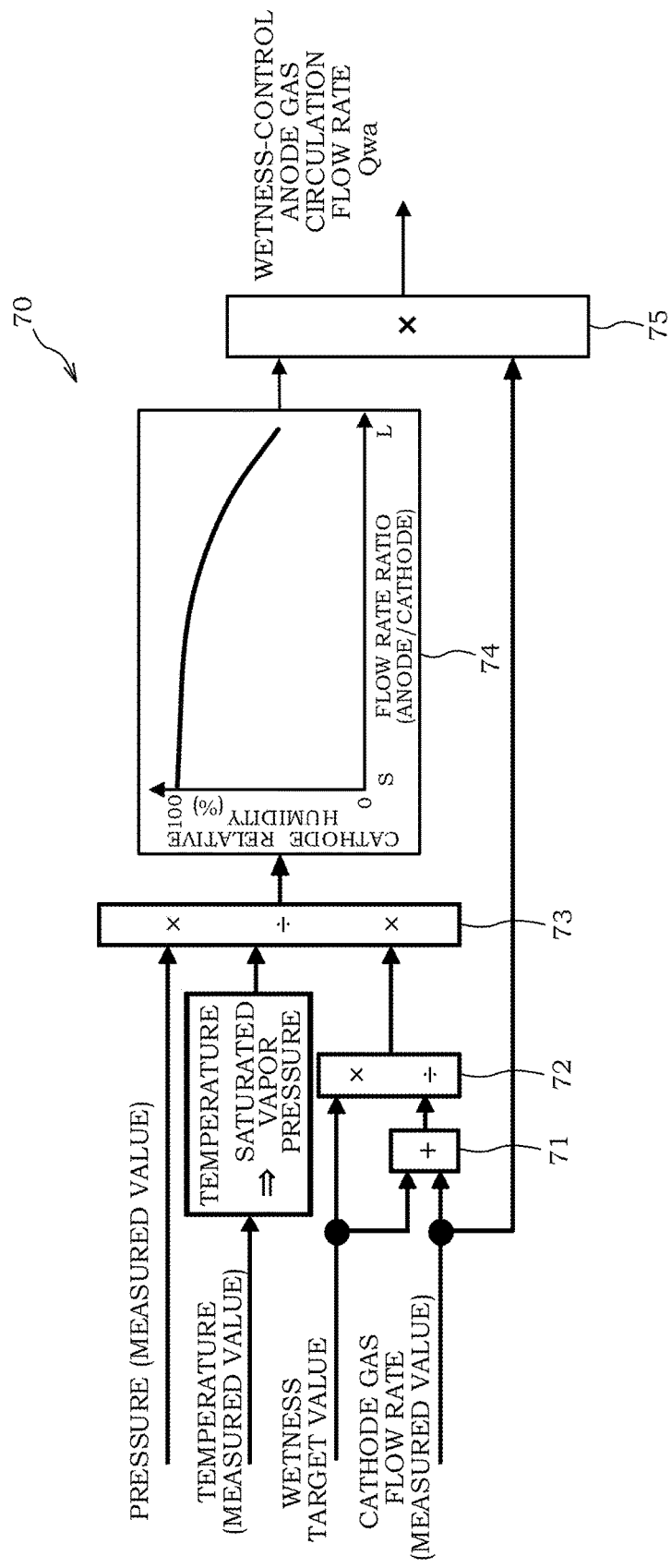
FIG. 12 is a diagram showing calculation processes in the wetness-control anode gas flow rate calculating unit during the wet control.

As shown in FIGS. 11 and 12, the wetness-control anode gas flow rate calculating unit 70 of the gas flow rate calculating unit 62 calculates the wetness-control anode gas circulation flow rate Qwa on the basis of the wetness target value, the measured value of the cathode gas pressure, the measured value of the cooling water temperature, and the measured value of the cathode gas flow rate during the wet control of increasing the degree of wetness of the fuel cell stack 1. Each calculation process in the wetness-control anode gas flow rate calculating unit 70 shown in FIG. 12 is similar to those shown in FIG. 7 except that the measured value of the cathode gas flow rate is used instead of the cathode gas required flow rate Qc. Thus, the wetness-control anode gas flow rate calculating unit 70 calculates the wetness-control anode gas circulation flow rate Qwa using the cathode gas required flow rate Qc during the dry control, while the wetness-control anode gas flow rate calculating unit 70 calculates the wetness-control anode gas circulation flow rate Qwa using the measured value of the cathode gas flow rate during the wet control.

It should be noted that, in the calculation of the wetness-control anode gas circulation flow rate during the wet control, the estimated values of the cathode gas pressure, the cooling water temperature, and the cathode gas flow rate may be used instead of using the measured values of the cathode gas pressure, the cooling water temperature, and the cathode gas flow rate. The wetness-control anode gas flow rate calculating unit 70 may be configured to calculate the cathode gas relative humidity from the wetness target value and the measured value or estimated value of the flow rate of the cathode gas to be supplied to the fuel cell stack 1 without using the cathode gas pressure and the cooling water temperature, and calculate the wetness-control anode gas circulation flow rate using the cathode gas relative humidity.

As shown in FIG. 11, the gas flow rate calculating unit 62 compares the wetness-control anode gas circulation flow rate Qwa calculated as described above in the target anode gas flow rate setting unit 91 with the anode gas required circulation flow rate Qa (see FIG. 9) obtained from the power generation request to the fuel cell stack 1, and sets the larger one of those flow rates as the target anode gas circulation flow rate Qta during the wet control.

Figure 13:
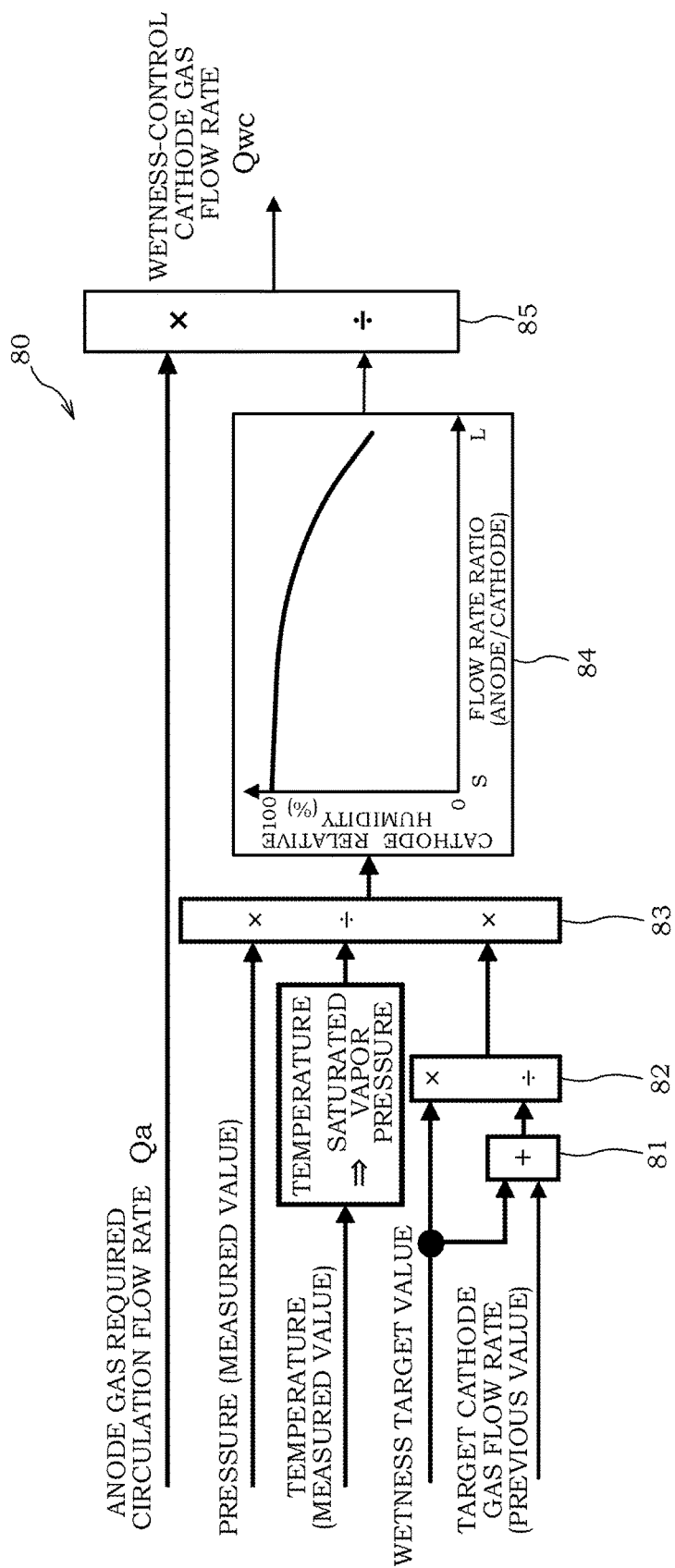
FIG. 13 is a diagram showing calculation processes in the wetness-control cathode gas flow rate calculating unit during the wet control.

On the other hand, as shown in FIGS. 11 and 13, the wetness-control cathode gas flow rate calculating unit 80 calculates the wetness-control cathode gas flow rate Qwc on the basis of the wetness target value, the measured value of the cathode gas pressure, the measured value of the cooling water temperature, and the anode gas required circulation flow rate Qa (see FIG. 9) obtained from the power generation request to the fuel cell stack 1 during the wet control. Each calculation process in the wetness-control cathode gas flow rate calculating unit 80 shown in FIG. 13 is similar to those shown in FIG. 10 except that the anode gas required circulation flow rate Qa is used instead of the measured value of the anode gas circulation flow rate. Thus, the wetness-control cathode gas flow rate calculating unit 80 calculates the wetness-control cathode gas flow rate Qwc using the measured value of the anode gas circulation flow rate during the dry control, while the wetness-control cathode gas flow rate calculating unit 80 calculates the wetness-control cathode gas flow rate Qwc using the anode gas required circulation flow rate Qa during the wet control.

It should be noted that, in the calculation of the wetness-control cathode gas flow rate during the wet control, the estimated values of the cathode gas pressure and the cooling water temperature may be used instead of using the measured values of the cathode gas pressure and the cooling water temperature.

As shown in FIG. 11, the gas flow rate calculating unit 62 compares the wetness-control cathode gas flow rate Qwc calculated as described above in the target cathode gas flow rate setting unit 92 with the cathode gas required flow rate Qc (see FIG. 8) obtained from the power generation request to the fuel cell stack 1, and sets the larger one of those flow rates as the target cathode gas flow rate Qtc during the wet control.

Thus, in the gas flow rate calculating unit 62, the wetness-control cathode gas flow rate Qwc during the wet control is calculated at least on the basis of the wetness target value and the anode gas required circulation flow rate Qa necessary when the fuel cell stack 1 generates electric power in the normal state. On the other hand, the wetness-control anode gas circulation flow rate Qwa during the wet control is calculated at least on the basis of the wetness target value and the measured value or estimated value of the cathode gas flow rate. In other words, the wetness-control anode gas circulation flow rate and the wetness-control cathode gas flow rate during the wet control are calculated to compensate for a shortage of the wet control by the anode gas circulation flow rate control when the degree of wetness cannot be controlled to the wet side on the basis of the cathode gas flow rate. By calculating the both gas flow rates in this manner, it is possible to prioritize the wet control by the cathode gas flow rate control over the wet control by the anode gas circulation flow rate control as described later with reference to FIG. 14.

Next, the wetness control in the fuel cell system 100 according to the present embodiment will be described with reference to FIG. 14, and a wetness control in a fuel cell system according to a reference example will be described with reference to FIG. 15.

Figure 15:
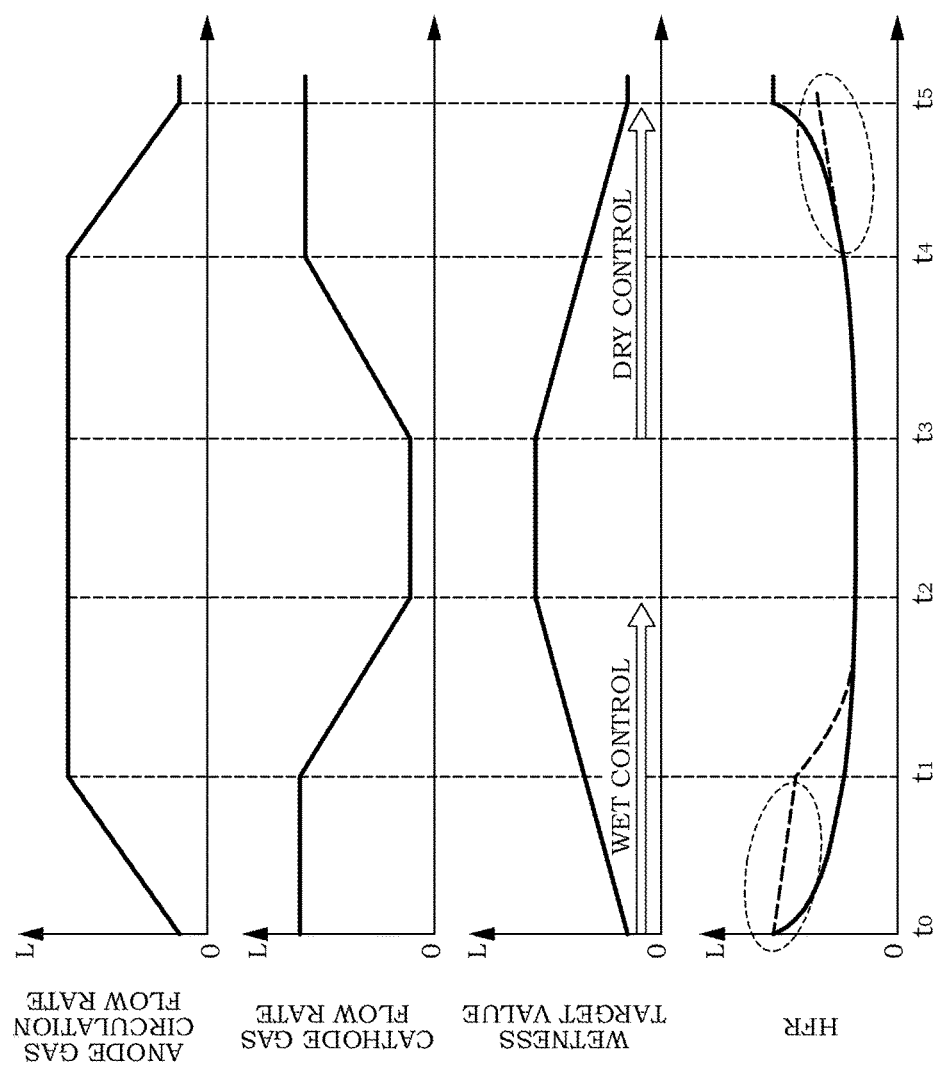
FIG. 15 is a timing chart showing an example of a wetness control in a fuel cell system according to a reference example.

As shown in FIG. 15, the wet control is carried out in accordance with a wetness target value from time t0 to time t2 in the fuel cell system according to the reference example.

Since the anode gas circulation flow rate is increased (flow rate ratio decreases) with the cathode gas flow rate kept high from time t0 to time t1, the degree of wetness cannot be controlled to the wet side even if the anode gas circulation flow rate is increased. Accordingly, the HFR measured value (broken line) hardly decreases, and is largely deviated from the HFR target value (solid line). Due to a reduction of the cathode gas flow rate after time t1, the HFR measured value converges toward the HFR target value. As described above, the wet control cannot be effectively carried out with the cathode gas flow rate kept high even if the anode gas circulation flow rate is increased.

Further, in the fuel cell system according to the reference example, the dry control is carried out in accordance with the wetness target value from time t3 to time t5.

From time t3 to time t4, the dry control is carried out by increasing the cathode gas flow rate, and the HFR measured value (broken line) follows the HFR target value (solid line). However, since the anode gas circulation flow rate is reduced (flow rate ratio decreases) with the cathode gas flow rate kept high from time t4 to time t5, the degree of wetness cannot to be controlled to the dry side even if the anode gas circulation flow rate is reduced. Accordingly, the HFR measured value hardly increases, and starts deviating from the HFR target value. As described above, the dry control cannot be effectively carried out with the cathode gas flow rate kept high even if the anode gas circulation flow rate is reduced.

Figure 14:
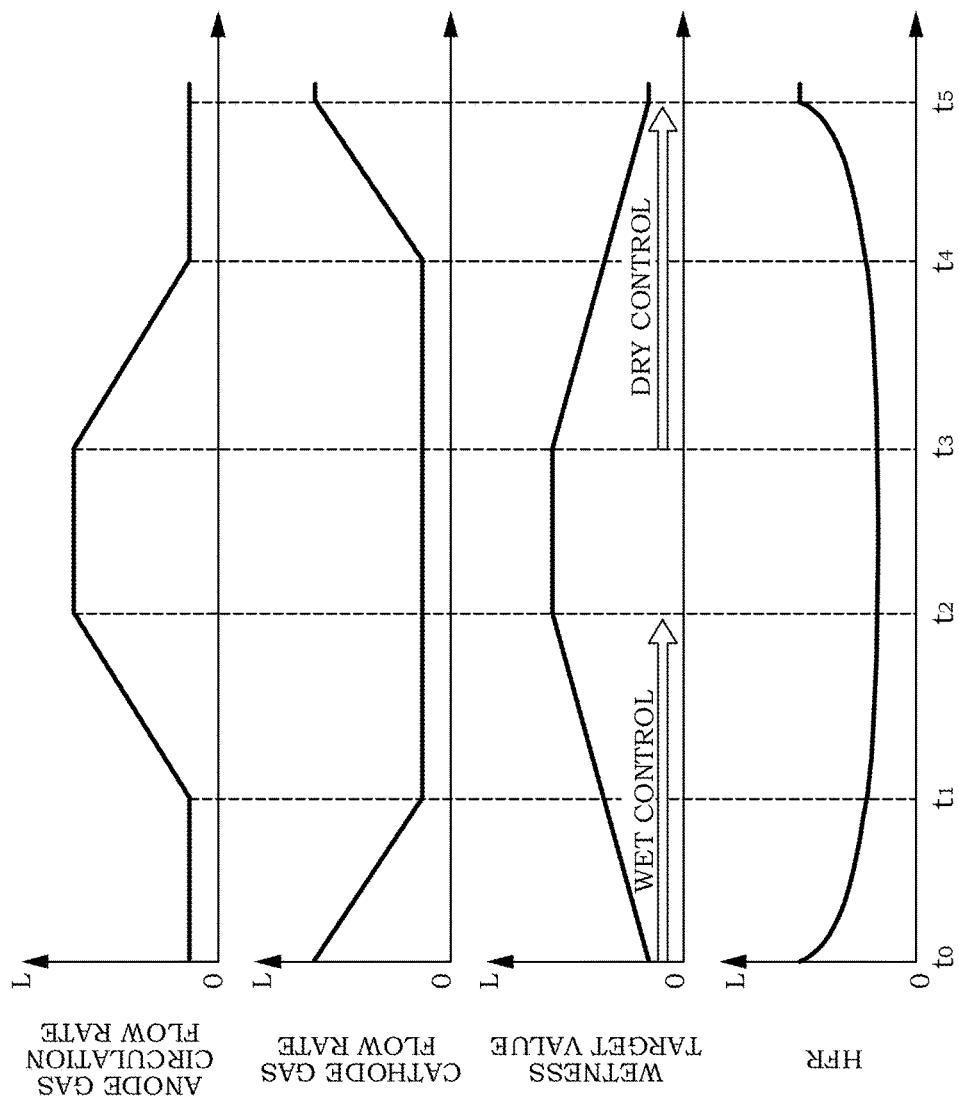
FIG. 14 is a timing chart showing an example of the wetness control in the fuel cell system according to the embodiment of the present invention.

On the other hand, as shown in FIG. 14, the wet control is carried out in accordance with the wetness target value from time t0 to time t2 in the fuel cell system 100.

During the wet control, the wetness-control cathode gas flow rate Qwc is calculated at least on the basis of the wetness target value and the anode gas required circulation flow rate Qa necessary when the fuel cell stack 1 generates electric power in the normal state, and the wetness-control anode gas circulation flow rate Qwa is calculated at least on the basis of the wetness target value and the measured value of the cathode gas flow rate. In other words, the wetness-control anode gas circulation flow rate and the wetness-control cathode gas flow rate during the wet control are calculated to compensate for a shortage of the wet control by the cathode gas flow rate control by the anode gas circulation flow rate control. By setting the target cathode gas flow rate and the target anode gas circulation flow rate utilizing the wetness-control cathode gas flow rate Qwc and the wetness-control anode gas circulation flow rate Qwa, the wet control by the cathode gas flow rate control functions in a manner prioritized over the wet control by the anode gas circulation flow rate control. This makes it possible to suppress the execution of the wet control by an increase in the anode gas circulation flow rate so long as the wet control by a decrease in the cathode gas flow rate can be carried out.

Accordingly, from time t0 to time t1, the cathode gas flow rate is reduced with the anode gas circulation flow rate kept high, and the wet control by the cathode gas flow rate control is carried out in a prioritized manner. After time t1 at which the wet control cannot be carried out only by a decreasing control of the cathode gas flow rate, the anode gas circulation flow rate is increased, and the wet control by the anode gas circulation flow rate control is carried out. At this time, since the cathode gas flow rate is suppressed low and the ratio of the anode gas circulation flow rate to the cathode gas flow rate is large, the electrolyte membranes 111 of the fuel cell stack 1 can be humidified by an increasing control of the anode gas circulation flow rate. This also causes the HFR measured value to follow the HFR target value without deviation after time t1.

In this regard, the HFR has a tendency to hardly change as the electrolyte membranes 111 of the fuel cell stack 1 become wetter. For this reason, a change amount of the HFR from time t1 to time t2 is smaller than that from time t0 to time t1.

Thus, the fuel cell system 100 is configured such that the shortage of the wet control is compensated for by the anode gas circulation flow rate control when the degree of wetness cannot be controlled to the wet side on the basis of the cathode gas flow rate control. Thus, according to the fuel cell system 100, the degree of wetness of the fuel cell stack 1 can be properly adjusted to the wet side without uselessly controlling the anode gas circulation flow rate and the cathode gas flow rate.

Further, in the fuel cell system 100, the dry control is carried out in accordance with the wetness target value from time t3 to time t5.

During the dry control, the wetness-control anode gas circulation flow rate Qwa is calculated at least on the basis of the wetness target value and the cathode gas required flow rate Qc necessary when the fuel cell stack 1 generates electric power in the normal state, and the wetness-control cathode gas flow rate Qwc is calculated at least on the basis of the wetness target value and the measured value of the anode gas circulation flow rate. In other words, the wetness-control anode gas circulation flow rate and the wetness-control cathode gas flow rate during the dry control are calculated to compensate for a shortage of the dry control by the anode gas circulation flow rate control by the cathode gas flow rate control. By setting the target cathode gas flow rate and the target anode gas circulation flow rate utilizing the wetness-control cathode gas flow rate Qwc and the wetness-control anode gas circulation flow rate Qwa, the dry control by the anode gas circulation flow rate control functions in a manner prioritized over the dry control by the cathode gas flow rate control. This makes it possible to suppress the execution of the dry control by an increase in the cathode gas flow rate so long as the dry control by a decrease of the anode gas circulation flow rate can be carried out.

Accordingly, from time t3 to time t4, the anode gas circulation flow rate is decreased with the cathode gas flow rate suppressed low, and the dry control by the anode gas circulation flow rate control is carried out in a prioritized manner. After time t4 at which the dry control cannot be carried out only by a decreasing control of the anode gas circulation flow rate, the cathode gas flow rate is increased, and the dry control by the cathode gas flow rate control is carried out. Since an increasing control of the cathode gas flow rate is carried out after a decreasing control of the anode gas circulation flow rate in this manner, the electrolyte membranes 111 of the fuel cell stack 1 can be properly dried by these gas flow rate controls. This causes the HFR measured value to follow the HFR target value without deviation.

Thus, the fuel cell system 100 is configured such that the shortage of the dry control is compensated for by the cathode gas flow rate control when the degree of wetness cannot be controlled to the dry side on the basis of the anode gas circulation flow rate control. Thus, according to the fuel cell system 100, the degree of wetness of the fuel cell stack 1 can be properly adjusted to the dry side without uselessly controlling the anode gas circulation flow rate and the cathode gas flow rate.

Figure 16:
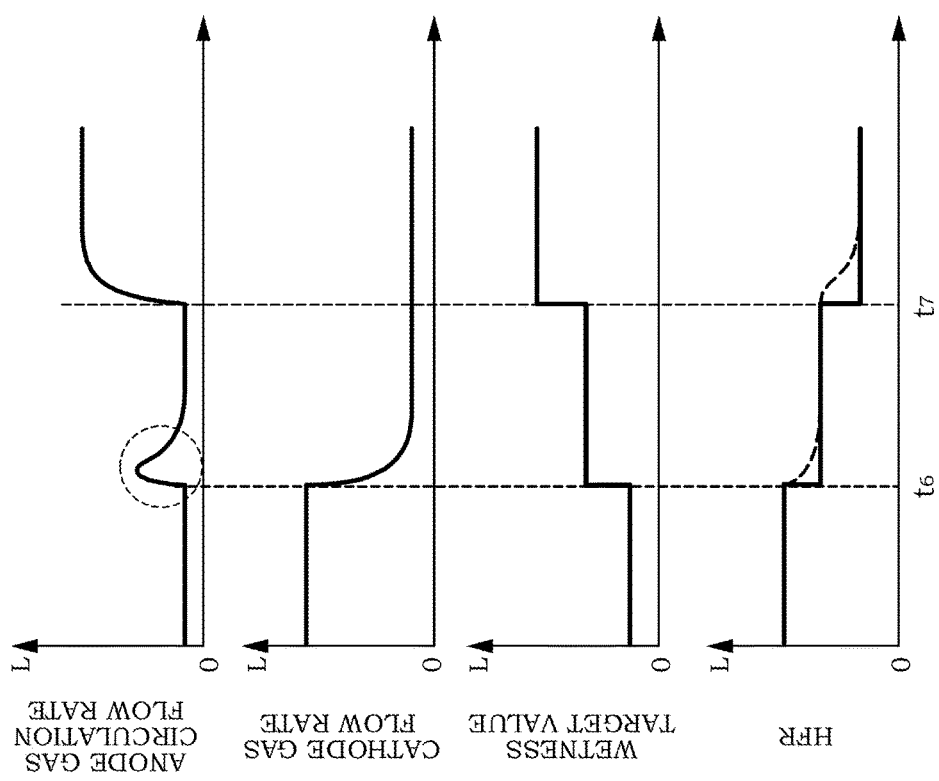
FIG. 16 is a timing chart showing an example of the wetness control in the fuel cell system according to the embodiment of the present invention.

In FIG. 14, the wetness control when the wetness target value moderately changes has been described. However, the wetness target value may suddenly change depending on the vehicle driving state. Hereinafter, a wet control in a case where the wetness target value suddenly increases at time t6 and time t7 will be described with reference to FIG. 16.

As described above, in the fuel cell system 100, the wetness-control anode gas circulation flow rate and the wetness-control cathode gas flow rate are calculated to suppress the execution of the wet control by the anode gas circulation flow rate control as long as the wet control can be carried out by adjusting the cathode gas flow rate.

Accordingly, when the wetness target value suddenly increases at time t6, the cathode gas flow rate is controlled to decrease, and the anode gas circulation flow rate is controlled to temporarily increase so as to compensate for a response delay of the actual cathode gas flow rate from the target cathode gas flow rate. In this manner, a part of the degree of wetness which cannot be adjusted to the wet side only by the cathode gas flow rate control is compensated for by the wet control on the basis of the anode gas circulation flow rate control. As a result, even if the wetness target value suddenly increases, a deviation of the HFR measured value (broken line) from the HFR target value (solid line) can be suppressed to a minimum level.

In a case where the wetness target value suddenly increases at time t7 after time t6, the cathode gas flow rate is already low and cannot be decreased any further. For this reason, the wet control is carried out by a control to increase the anode gas circulation flow rate. The cathode gas flow rate is low during the wet control by the anode gas circulation flow rate control. Thus, the HFR measured value (broken line) converges toward the HFR target value (solid line) although having a slight response delay.

It should be noted that, in a case where the wetness target value suddenly decreases in the fuel cell system 100, a part of the degree of wetness which cannot be adjusted to the dry side only by the anode gas circulation flow rate control is compensated for by the dry control on the basis of the cathode gas flow rate control. As a result, even if the wetness target value suddenly decreases, the dry control can be effectively carried out.

According to the fuel cell system 100 of the present embodiment described above, the following effects can be obtained.

The fuel cell system 100 includes the wetness target value calculating unit 61 for calculating the target value of the wet state of the fuel cell stack 1, the gas required flow rate calculating unit 63 for calculating the cathode gas required flow rate on the basis of the power generation request to the fuel cell stack 1, the wetness-control anode gas flow rate calculating unit 70 for calculating the wetness-control anode gas circulation flow rate at least on the basis of the wetness target value and the cathode gas required flow rate during the dry control, and the recirculation pump 39 (anode gas flow rate control unit) for controlling the anode gas circulation flow rate on the basis of the wetness-control anode gas circulation flow rate. Moreover, the fuel cell system 100 includes the wetness-control cathode gas flow rate calculating unit 80 for calculating the wetness-control cathode gas flow rate at least on the basis of the wetness target value and the measured value or estimated value of the anode gas circulation flow rate during the dry control, and the cathode compressor 23 (cathode gas flow rate control unit) for controlling the cathode gas flow rate on the basis of the cathode gas required flow rate and the wetness-control cathode gas flow rate. According to such a fuel cell system 100, the shortage of the dry control by the anode gas circulation flow rate control can be compensated for by the cathode gas flow rate control, and the degree of wetness of the fuel cell stack 1 can be properly controlled to the dry side as shown in FIG. 14.

On the other hand, during the wet control, the gas required flow rate calculating unit 63 calculates the anode gas required circulation flow rate on the basis of the power generation request to the fuel cell stack 1, and the wetness-control cathode gas flow rate calculating unit 80 calculates the wetness-control cathode gas flow rate at least on the basis of the wetness target value and the anode gas required circulation flow rate. At this time, the wetness-control anode gas flow rate calculating unit 70 calculates the wetness-control anode gas circulation flow rate at least on the basis of the wetness target value and the measured value or estimated value of the cathode gas flow rate. According to such a fuel cell system 100, the shortage of the wet control by the cathode gas flow rate control can be compensated for by the anode gas circulation flow rate control, and the degree of wetness of the fuel cell stack 1 can be properly controlled to the wet side as shown in FIG. 14.

As described above, according to the fuel cell system 100, the wetness control of the fuel cell stack 1 can be properly carried out. For this reason, the anode gas circulation flow rate and the cathode gas flow rate are not uselessly controlled. Therefore, the recirculation pump 39 and the cathode compressor 23 can be effectively operated at the time of the wetness control, and this makes it possible to improve power consumption performance in the fuel cell system 100.

In a case of viewing the fuel cell system 100 from a perspective different from the above one, the fuel cell stack 1 includes the recirculation pump 39 for controlling the anode gas circulation flow rate in accordance with the target anode gas circulation flow rate, and the cathode compressor 23 for controlling the cathode gas flow rate in accordance with the target cathode gas flow rate. Moreover, the fuel cell stack 1 further includes the wetness target value calculating unit 61 for calculating the target value of the wet state of the fuel cell stack 1, and the gas required flow rate calculating unit 63 for calculating the cathode gas required flow rate and the anode gas required circulation flow rate on the basis of the power generation request to the fuel cell stack 1. Further, the fuel cell system 100 includes the wetness-control cathode gas flow rate calculating unit 80 for calculating the wetness-control cathode gas flow rate at least on the basis of the wetness target value and the measured value or estimated value of the anode gas circulation flow rate during the dry control, the wetness-control anode gas flow rate calculating unit 70 for calculating the wetness-control anode gas circulation flow rate at least on the basis of the wetness target value and the cathode gas required flow rate during the dry control, the target cathode gas flow rate setting unit 92 for setting the target cathode gas flow rate on the basis of the cathode gas required flow rate and the wetness-control cathode gas flow rate, and the target anode gas flow rate setting unit 91 for setting the target anode gas flow rate on the basis of the anode gas required circulation flow rate and the wetness-control anode gas circulation flow rate. The wetness-control anode gas circulation flow rate and the wetness-control cathode gas flow rate during the dry control are calculated to compensate for the shortage of the dry control by the anode gas circulation flow rate control by the cathode gas flow rate control. By setting the target anode gas circulation flow rate and the target cathode gas flow rate using these wetness-control anode gas circulation flow rate and wetness-control cathode gas flow rate, the dry control by the anode gas circulation flow rate control can be prioritized over the dry control by the cathode gas flow rate control and the degree of wetness of the fuel cell stack 1 can be properly controlled to the dry side as shown in FIG. 14.

On the other hand, during the wet control, the wetness-control anode gas flow rate calculating unit 70 calculates the wetness-control anode gas circulation flow rate at least on the basis of the wetness target value and the measured value or estimated value of the cathode gas flow rate, and the wetness-control cathode gas flow rate calculating unit 80 calculates the wetness-control cathode gas flow rate at least on the basis of the wetness target value and the anode gas required circulation flow rate. The wetness-control anode gas circulation flow rate and the wetness-control cathode gas flow rate during the wet control are calculated to compensate for the shortage of the wet control by the cathode gas flow rate control by the anode gas circulation flow rate control. By setting the target anode gas circulation flow rate and the target cathode gas flow rate using these wetness-control anode gas circulation flow rate and wetness-control cathode gas flow rate, the wet control by the cathode gas flow rate control can be prioritized over the wet control by the anode gas circulation flow rate control, and the degree of wetness of the fuel cell stack 1 can be properly controlled to the wet side as shown in FIG. 14.

The recirculation pump 39 and the cathode compressor 23 can be effectively operated at the time of the wetness control also by the fuel cell system 100 described above, and this makes it possible to improve power consumption performance in the fuel cell system 100.

Although the embodiment of the present invention has been described above, the above embodiment is merely an illustration of one application example of the present invention and is not intended to limit the technical scope of the present invention to the specific configuration of the above embodiment.

Figure 17:
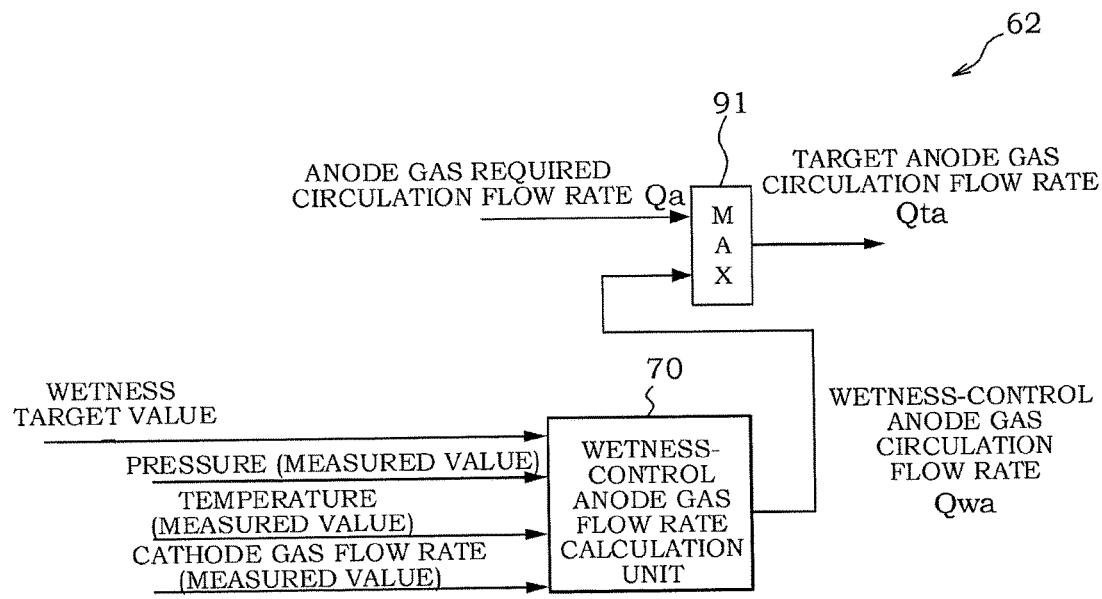
FIG. 17 is a diagram showing a calculation process of the target anode gas circulation flow rate during the dry control in a case where a cathode gas flow rate control is impossible.
Figure 18:
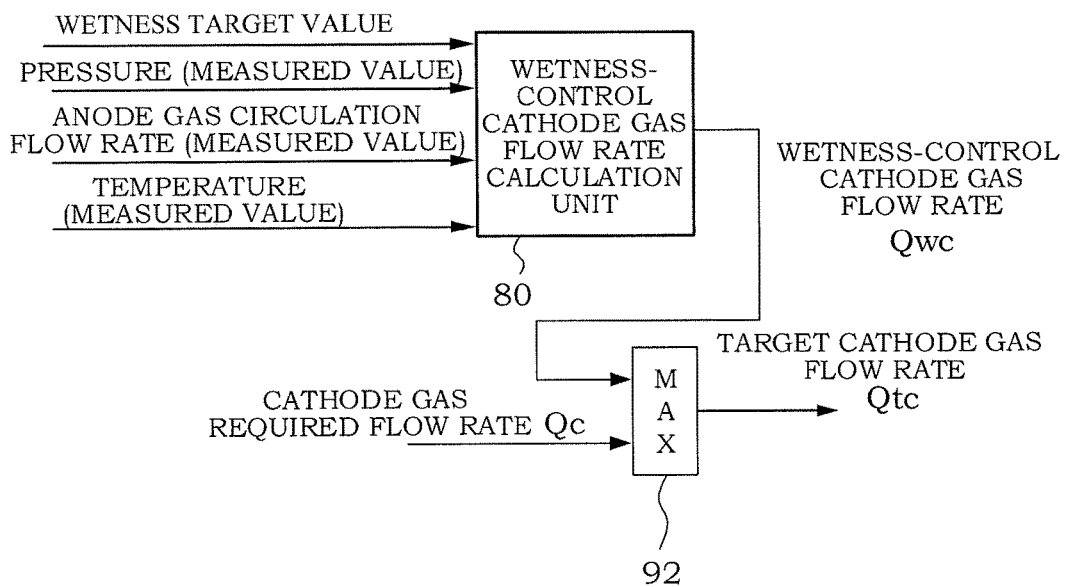
FIG. 18 is a diagram showing a calculation process of the target cathode gas flow rate during the wet control in a case where an anode gas circulation flow rate control is impossible.

A fuel cell system 100 according to a modification will be described with reference to FIGS. 17 and 18. FIG. 17 shows a calculation process of the target anode gas circulation flow rate during the dry control when the cathode gas flow rate control is impossible. FIG. 18 shows a calculation process of the target cathode gas flow rate during the wet control when the anode gas circulation flow rate control is impossible.

In the fuel cell system 100, the cathode gas flow rate control may become impossible such as when an abnormality occurs in the cathode compressor 23. In such a case, the wetness-control anode gas flow rate calculating unit 70 uses the measured value or estimated value of the cathode gas flow rate instead of using the cathode gas required flow rate Qc obtained from FIG. 8 in calculating the wetness-control anode gas circulation flow rate during the dry control. In other words, as shown in FIG. 17, the wetness-control anode gas flow rate calculating unit 70 calculates the wetness-control anode gas circulation flow rate Qwa during the dry control on the basis of the wetness target value, the measured value of the cathode gas pressure, the measured value of the cooling water temperature and the measured value (estimated value) of the cathode gas flow rate. It should be noted that the calculation of the target cathode gas flow rate Qtc in the gas flow rate calculating unit 62 may be stopped when the cathode gas flow rate control is impossible.

In a case where the cathode gas flow rate cannot be controlled, the target anode gas circulation flow rate Qta is calculated on the basis of the wetness-control anode gas circulation flow rate Qwa obtained using the flow rate of the cathode gas being actually supplied to the fuel cell stack 1. Thus, the dry control suitable for an abnormal state of a cathode gas flow rate control system can be carried out.

Moreover, in the fuel cell system 100, the anode gas circulation flow rate control may become impossible such as when an abnormality occurs in the recirculation pump 39. In such a case, the wetness-control cathode gas flow rate calculating unit 80 uses the measured value or estimated value of the anode gas circulation flow rate instead of using the anode gas required circulation flow rate Qa obtained from FIG. 9 in calculating the wetness control target cathode gas flow rate during the wet control. In other words, as shown in FIG. 18, the wetness-control cathode gas flow rate calculating unit 80 calculates the wetness-control cathode gas flow rate Qwc on the basis of the wetness target value, the measured value of the cathode gas pressure, the measured value of the cooling water temperature, and the measured value (estimated value) of the anode gas circulation flow rate. It should be noted that the gas flow rate calculating unit 62 may stop the calculation of the target anode gas circulation flow rate Qta when the anode gas circulation flow rate control is impossible.

In a case where the anode gas circulation flow rate cannot be controlled, the target cathode gas flow rate Qtc is calculated on the basis of the wetness-control cathode gas flow rate Qwc obtained using the flow rate of the anode gas being actually supplied to the fuel cell stack 1. Thus, the wet control suitable for an abnormal state of an anode gas circulation flow rate control system can be carried out.

The invention claimed is:

1. A fuel cell system comprising a fuel cell for generating electric power while receiving supplies of an anode gas and a cathode gas and a circulation mechanism configured to supply an anode off-gas discharged from the fuel cell to the fuel cell, the fuel cell system further comprising:
   a wetness target value calculating unit programmed to calculate a wetness target value of a wet state of the fuel cell;
   a cathode gas required flow rate calculating unit programmed to calculate a cathode gas required flow rate on the basis of a power generation request to the fuel cell;
   a wetness-control anode gas flow rate calculating unit programmed to calculate a wetness-control anode gas circulation flow rate at least on the basis of the wetness target value and the cathode gas required flow rate during a dry control;
   an anode gas flow rate control unit programmed to control an anode gas circulation flow rate on the basis of the wetness-control anode gas circulation flow rate;
   a wetness-control cathode gas flow rate calculating unit programmed to calculate a wetness-control cathode gas flow rate at least on the basis of the wetness target value and a measured value or estimated value of the anode gas circulation flow rate during the dry control; and
   a cathode gas flow rate control unit programmed to control a cathode gas flow rate on the basis of the cathode gas required flow rate and the wetness-control cathode gas flow rate.

2. The fuel cell system according to claim 1,
   wherein the anode gas flow rate control unit is programmed to carry out control to, during dry control, decrease the anode gas circulation flow rate, and the cathode gas flow rate control unit is programmed to carry out a control to increase the cathode gas flow rate after the control of the anode gas flow rate control unit.

3. The fuel cell system according to claim 1,
   wherein the cathode gas required flow rate calculating unit is programmed to calculate an anode gas required circulation flow rate on the basis of the power generation request to the fuel cell;
   wherein the wetness-control cathode gas flow rate calculating unit is programed to calculate the wetness-control cathode gas flow rate at least on the basis of the wetness target value and the anode gas required circulation flow rate during a wet control; and
   wherein the wetness-control anode gas flow rate calculating unit is programmed to calculate the wetness-control anode gas circulation flow rate at least on the basis of the wetness target value and a measured value or estimated value of the cathode gas flow rate during the wet control.

4. The fuel cell system according to claim 3,
   wherein the cathode gas flow rate control unit is programmed to carry out, during wet control, control to decrease the cathode gas flow rate, and the anode gas flow rate control unit is programmed to carry out a control to increase the anode gas circulation flow rate after the control of the cathode gas flow rate control unit.

5. The fuel cell system according to claim 1,
   wherein the wetness-control anode gas flow rate calculating unit is programmed to calculate the wetness-control anode gas circulation flow rate on the basis of the wetness target value and a measured value or estimated value of the cathode gas flow rate in a case where execution of a flow rate control by the cathode gas flow rate control unit is impossible during the dry control.

6. The fuel cell system according to claim 1,
   wherein the wetness-control cathode gas flow rate calculating unit is programmed to calculate the wetness-control cathode gas flow rate on the basis of the wetness target value and the measured value or estimated value of the anode gas circulation flow rate in a case where execution of a circulation flow rate control by the anode gas flow rate control unit is impossible during a wet control.

* * * * *